(12) United States Patent
Goossens et al.

(10) Patent No.: US 12,502,984 B2
(45) Date of Patent: Dec. 23, 2025

(54) HYBRID TRANSMISSION DC-SUPPLY (DIS)CONNECT

(71) Applicant: Dana Belgium N.V., Flanders (BE)

(72) Inventors: Stijn Goossens, Erpe-Mere (BE); Nicolas Lenaerts, Bruges (BE); Laurens De Bruyne, Middelkerke (BE)

(73) Assignee: DANA BELGIUM, Bruges (BE)

( * ) Notice: Subject to any disclaimer, the term of this patent is extended or adjusted under 35 U.S.C. 154(b) by 244 days.

(21) Appl. No.: 18/335,862

(22) Filed: Jun. 15, 2023

(65) Prior Publication Data

US 2023/0415585 A1    Dec. 28, 2023

Related U.S. Application Data

(60) Provisional application No. 63/366,955, filed on Jun. 24, 2022.

(51) Int. Cl.
| | | |
|---|---|---|
| *H02P 1/00* | (2006.01) | |
| *B60L 50/52* | (2019.01) | |
| *B60L 50/60* | (2019.01) | |
| *B60L 58/10* | (2019.01) | |

(52) U.S. Cl.
CPC .............. *B60L 50/52* (2019.02); *B60L 50/60* (2019.02); *B60L 58/10* (2019.02); *B60L 2240/423* (2013.01); *B60L 2240/547* (2013.01); *B60L 2240/549* (2013.01); *B60L 2260/40* (2013.01)

(58) Field of Classification Search
CPC ........ H02P 27/06; H02P 5/74; H02P 2101/25; G05B 2219/2637; B60L 50/52
See application file for complete search history.

(56) References Cited

U.S. PATENT DOCUMENTS

| | | |
|---|---|---|
| 7,267,191 B2 | 9/2007 | Xu et al. |
| 11,267,453 B1 | 3/2022 | Bolthouse et al. |
| 2009/0287366 A1* | 11/2009 | Davis ............... B60W 20/20 701/22 |
| 2022/0041156 A1 | 2/2022 | Imamura |
| 2022/0089143 A1 | 3/2022 | Bryan et al. |

FOREIGN PATENT DOCUMENTS

CN          103339005 A  * 10/2013  ............. B60K 6/445

\* cited by examiner

*Primary Examiner* — Karen Masih
(74) *Attorney, Agent, or Firm* — McCoy Russell LLP

(57) ABSTRACT

Methods and systems are provided for a hybrid transmission. In one example, a method for a hybrid transmission, comprising, adjusting voltage on an inverter of an electric motor prior to disconnecting or connecting a battery contact in response to a transition between a first mode and a second mode. In the first mode, a battery and at least the electric motor are used to power rotation of a transmission output shaft. In the second mode, an engine and at least the electric motor are used to power rotation of the transmission output shaft. In one example, the adjusting is initiated in response to a request to transition between the first mode and the second mode. In one example, the method includes controlling current to the battery to within a non-zero threshold of zero in response to the request to transition the first mode to the second mode.

20 Claims, 9 Drawing Sheets

HYBRID TRANSMISSION DC-SUPPLY (DIS)CONNECT

CROSS REFERENCE TO RELATED APPLICATION

The present application claims priority to U.S. Provisional Application No. 63/366,955, entitled "HYBRID TRANSMISSION DC-SUPPLY (DIS)CONNECT", and filed on Jun. 24, 2022. The entire contents of the above-listed application are hereby incorporated by reference for all purposes.

TECHNICAL FIELD

The present description relates generally to a hybrid transmission, and in particular, to systems and methods for interrupt free connection and disconnection of a DC-supply.

BACKGROUND AND SUMMARY

A hybrid transmission for a vehicle, such as a hybrid electric vehicle (HEV) may operate in different modes using different energy sources (e.g., hybrid electric, battery electric and engine only). In an engine-only mode, a battery may not be used and at least one electric motor may be used to power rotation of a transmission output shaft. For homologation, performance, and other similar purposes, it is desirable for the battery to connect/disconnect during vehicle operation (e.g., transitioning from hybrid mode to engine electric mode). It is desirable for connection/disconnection to occur without interrupting mechanical transmitted power and/or torque delivered by the hybrid transmission (e.g., without shutting down the vehicle to disconnect/connect the battery at shutdown/startup, and/or without the vehicle going to a torque free state where current is close to zero), and without significant current going through battery contactors at the moment of (dis)connect. It is also desirable for the transmission to handle auxiliary loads on a DC-bus (e.g., if current feedback is available). In some systems, transitioning among operating modes may include connecting and/or disconnecting the battery by shutting down the vehicle and disconnecting/connecting the battery at startup/shutdown, or by going to a torque free state where current in the system is approximately zero, which may result in torque interruption and/or interruption of a driving experience.

The inventors have recognized challenges to the above described methods and other systems for transitioning a hybrid transmission between a first operating mode and a second operating mode, where the first operating mode is a hybrid mode using a battery to power rotation of a transmission output shaft, and the second operating mode is an engine-electric mode that uses an engine to power rotation of the transmission output shaft. Both of the hybrid mode and the engine-electric mode may also use at least one electric motor to power rotation of the transmission output shaft. At least a portion of the aforementioned issues may be resolved by a method for a hybrid transmission, comprising, adjusting voltage on an inverter of an electric motor prior to disconnecting or connecting a battery contact in response to a transition between a first mode and a second mode, wherein in the first mode, a battery and at least the electric motor are used to power rotation of a transmission output shaft, and wherein in the second mode, an engine and at least the electric motor are used to power rotation of the transmission output shaft. In this way, the hybrid transmission may be transitioned between operating modes without torque interruption and without significant current flowing through battery contactors at the moment of connect/disconnect.

In one example, the adjusting is initiated in response to a request to transition between the first mode and the second mode. The method may include controlling current to the battery to within a non-zero threshold of zero in response to the request to transition the first mode to the second mode. In one example, the adjusting comprising setting one of a first voltage setpoint and a second voltage setpoint for the inverter of the electric motor. The first voltage setpoint may be set for a first inverter of a first electric motor operating as a generator and the first electric motor reduces voltage to the first voltage setpoint. The second voltage setpoint may be set for a first inverter of a first electric motor operating as a motor and the first electric motor reduces voltage to the second setpoint. In this way, the hybrid transmission may be transitioned between operating modes under various power flow scenarios.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
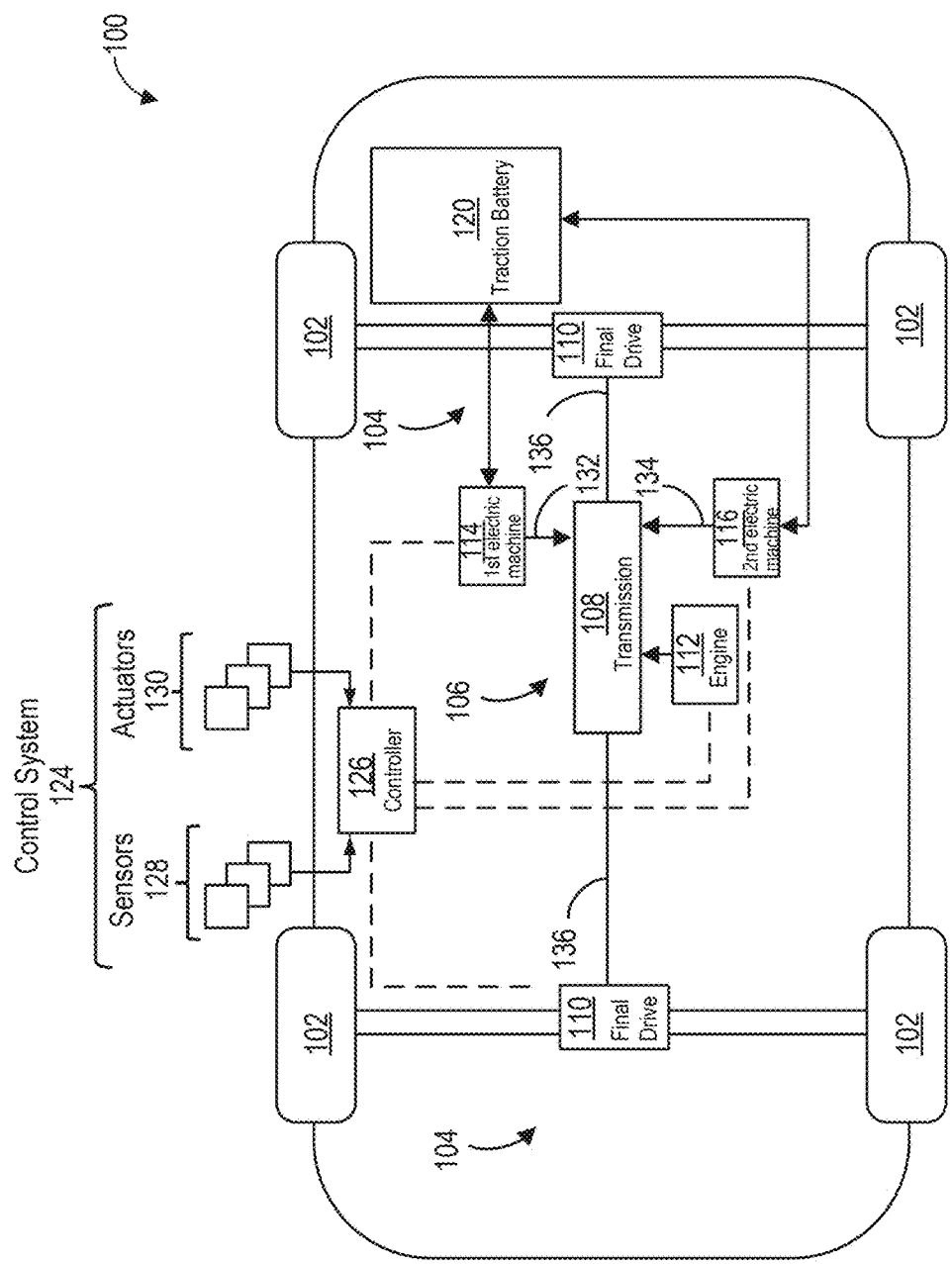
FIG. 1 shows a schematic diagram of an electrical drive train (e-drive) of a vehicle.
Figure 2:
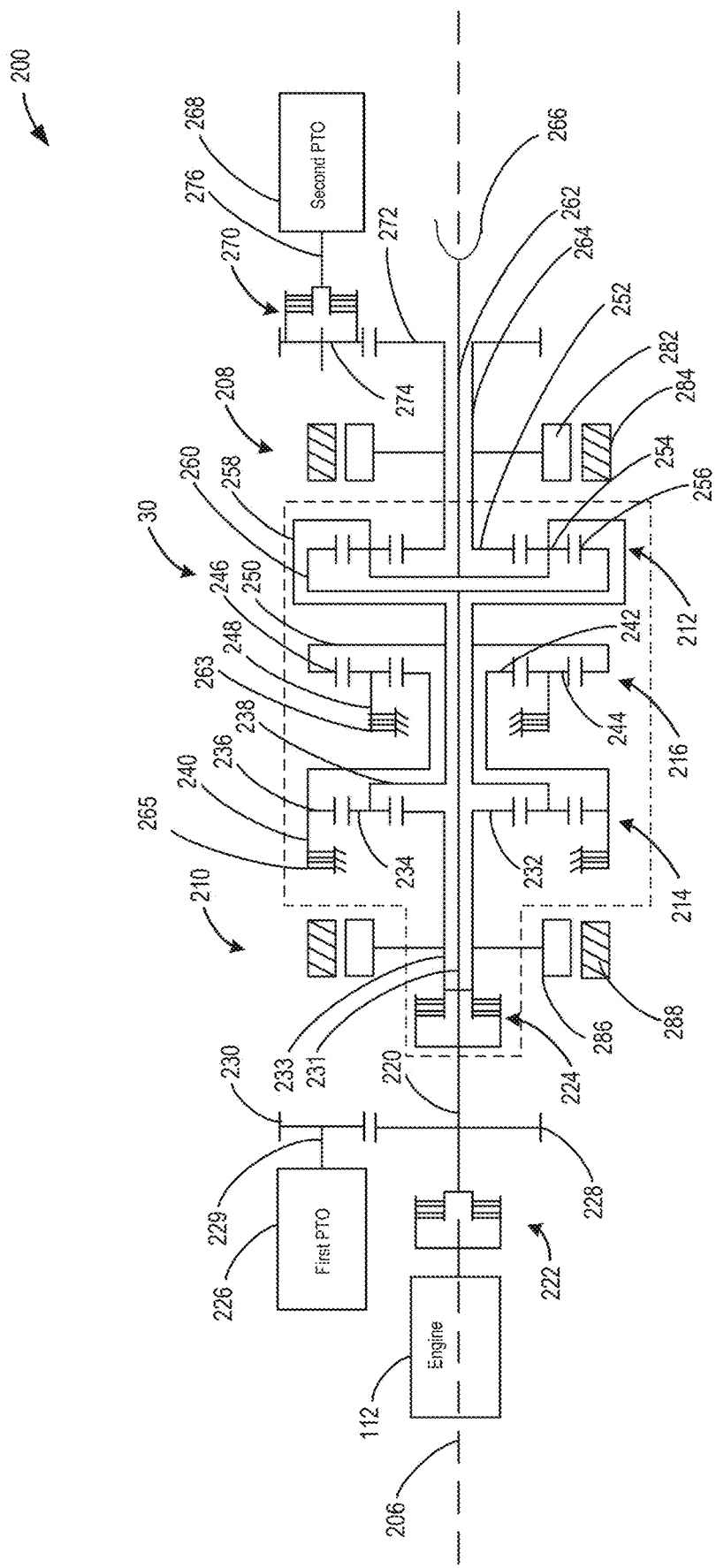
FIG. 2 shows a schematic diagram of an e-transmission, which may be part of the e-drive of FIG. 1.
Figure 3:
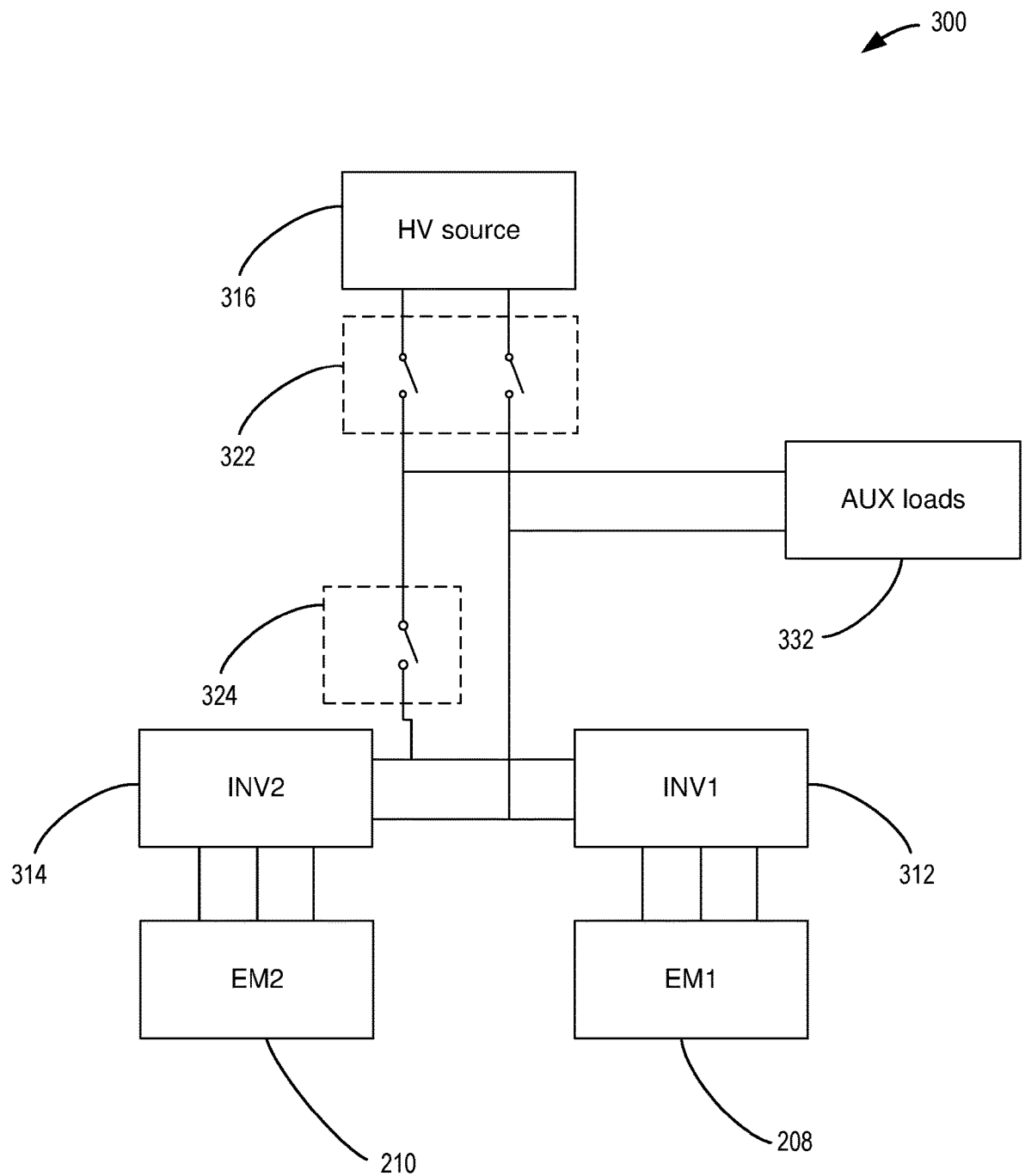
FIG. 3 shows a schematic diagram of couplings of elements of an e-transmission, which may be the e-transmission of FIG. 2.
Figure 4:
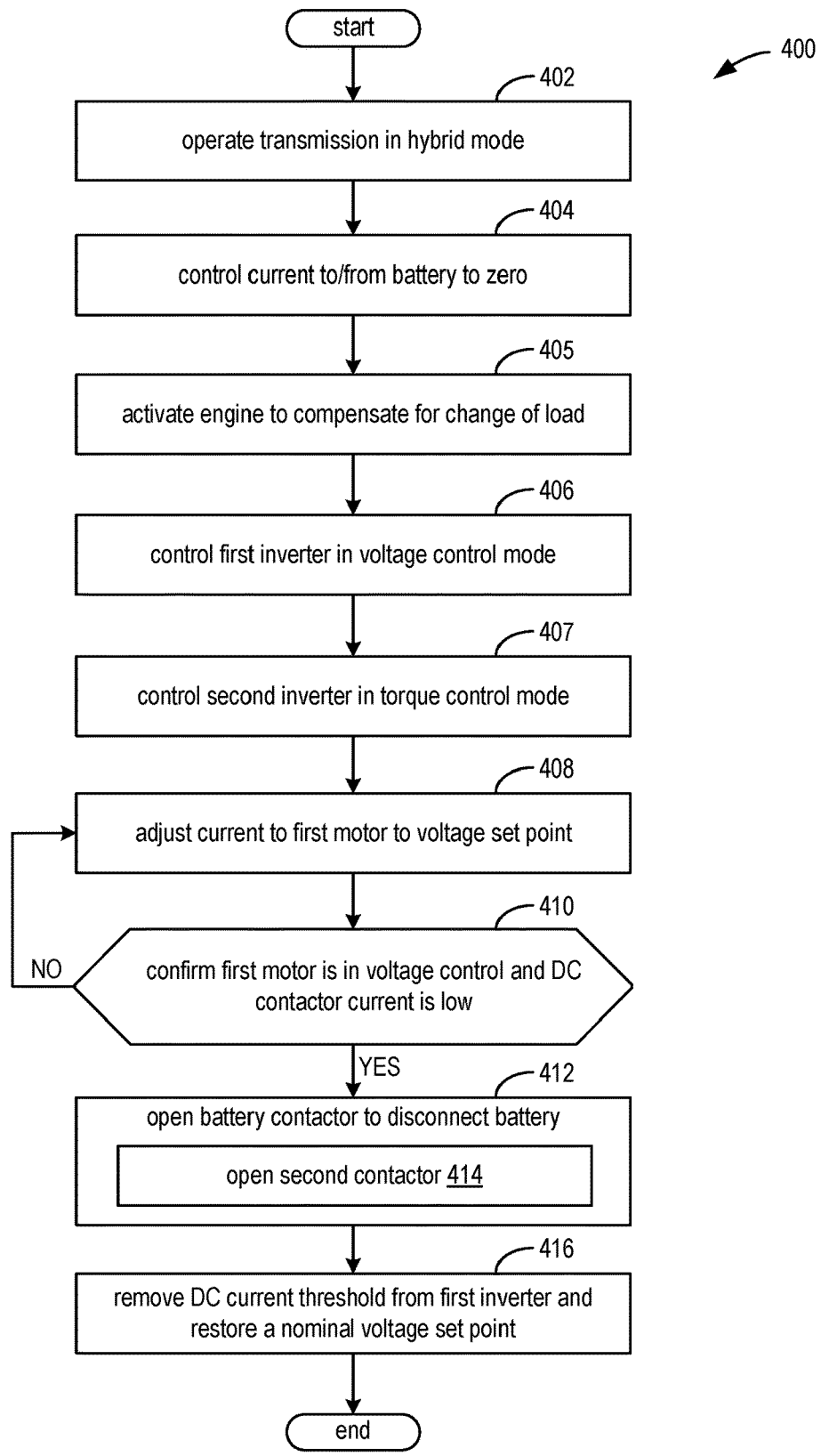
FIG. 4 illustrates a method for transitioning an e-transmission from a hybrid mode to an engine-electric mode.
Figure 5A:
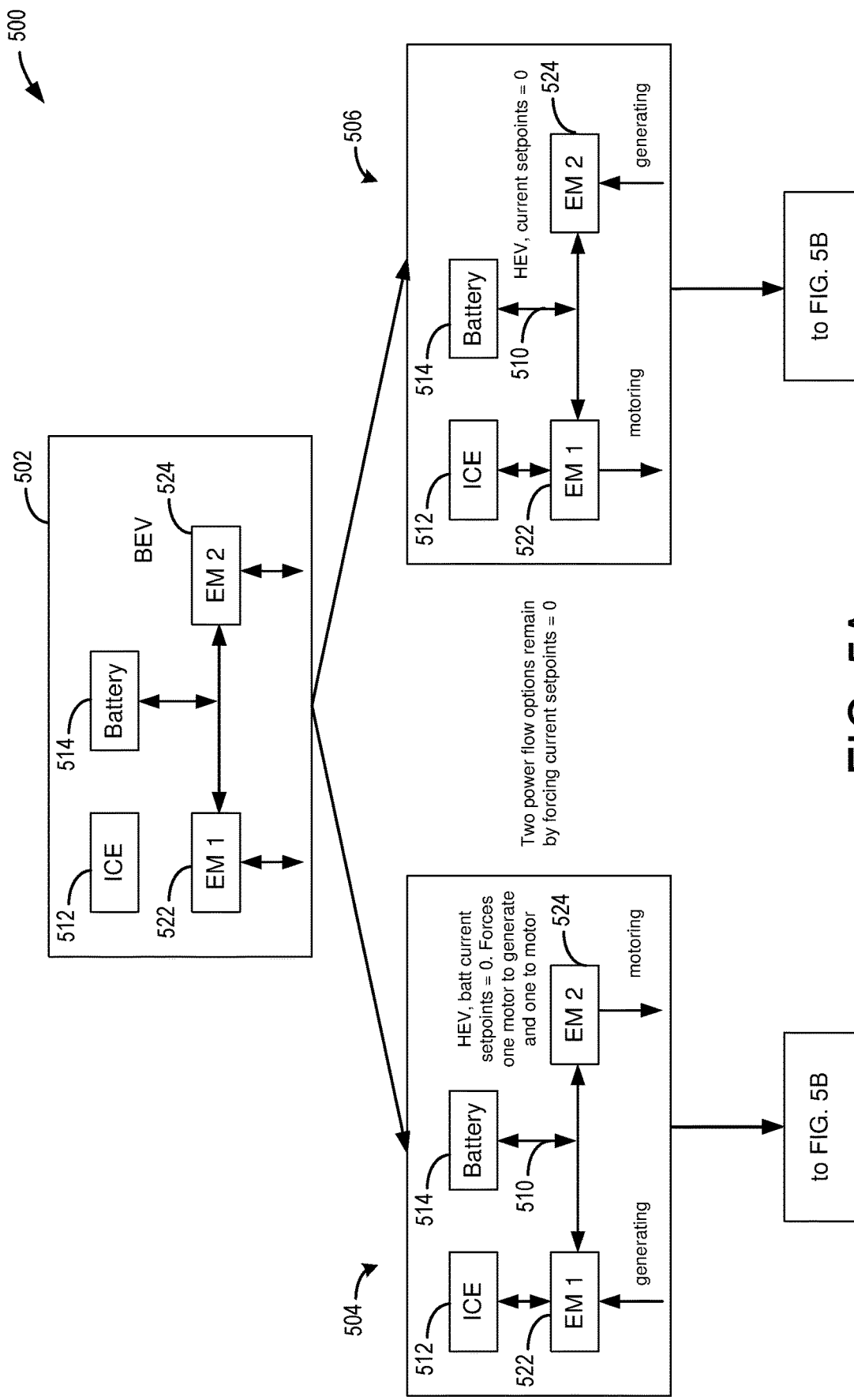
FIGS. 5A-5B show power flows which may occur during transition of an e-transmission from a hybrid mode to an engine-electric mode, such as according to the method of FIG. 4.
Figure 5B:
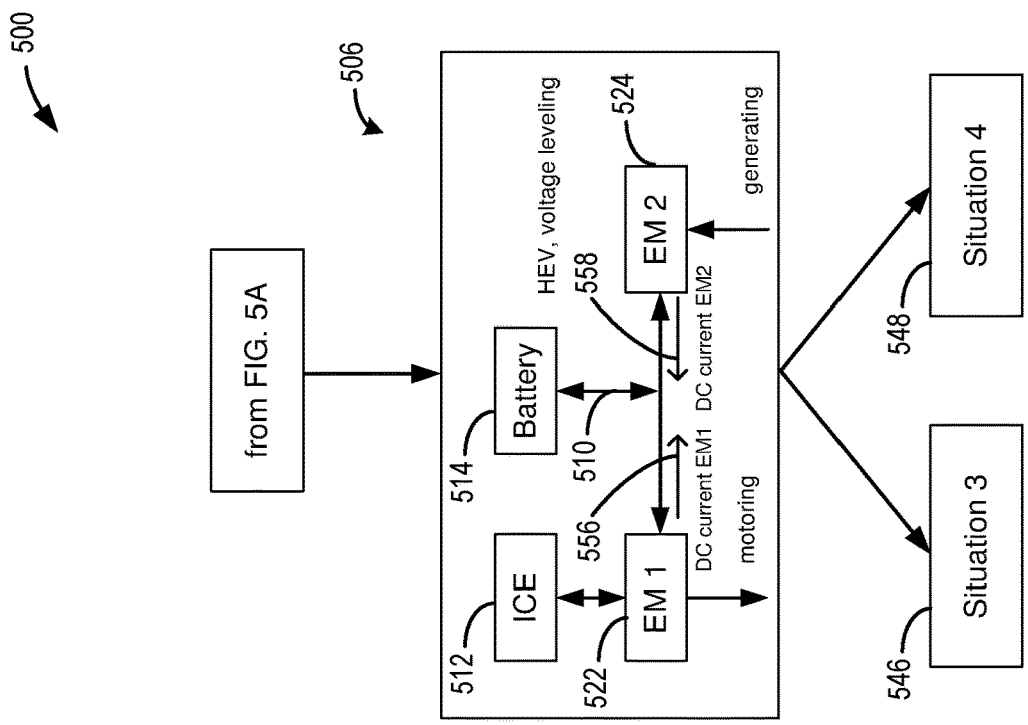
Figure 5B:
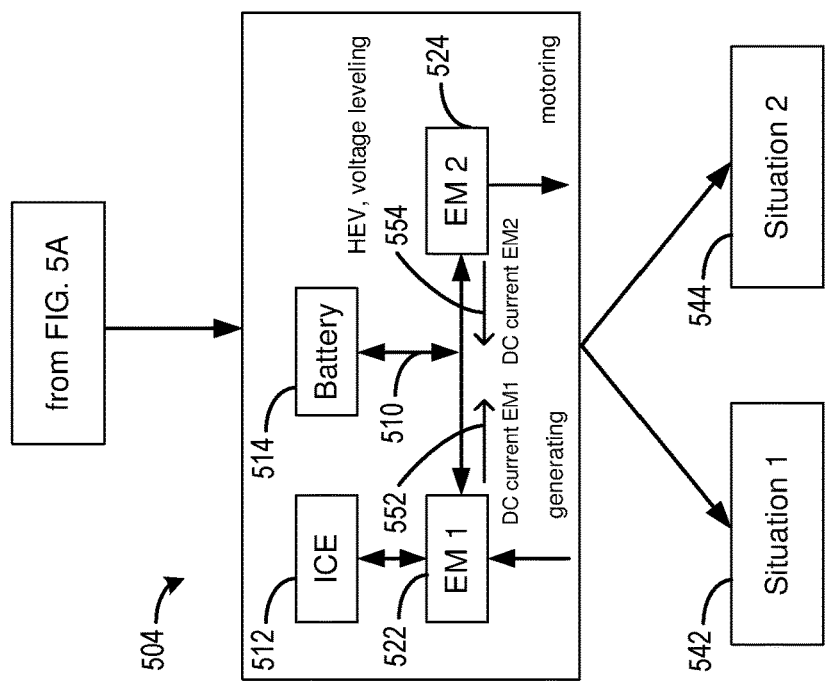
Figure 6:
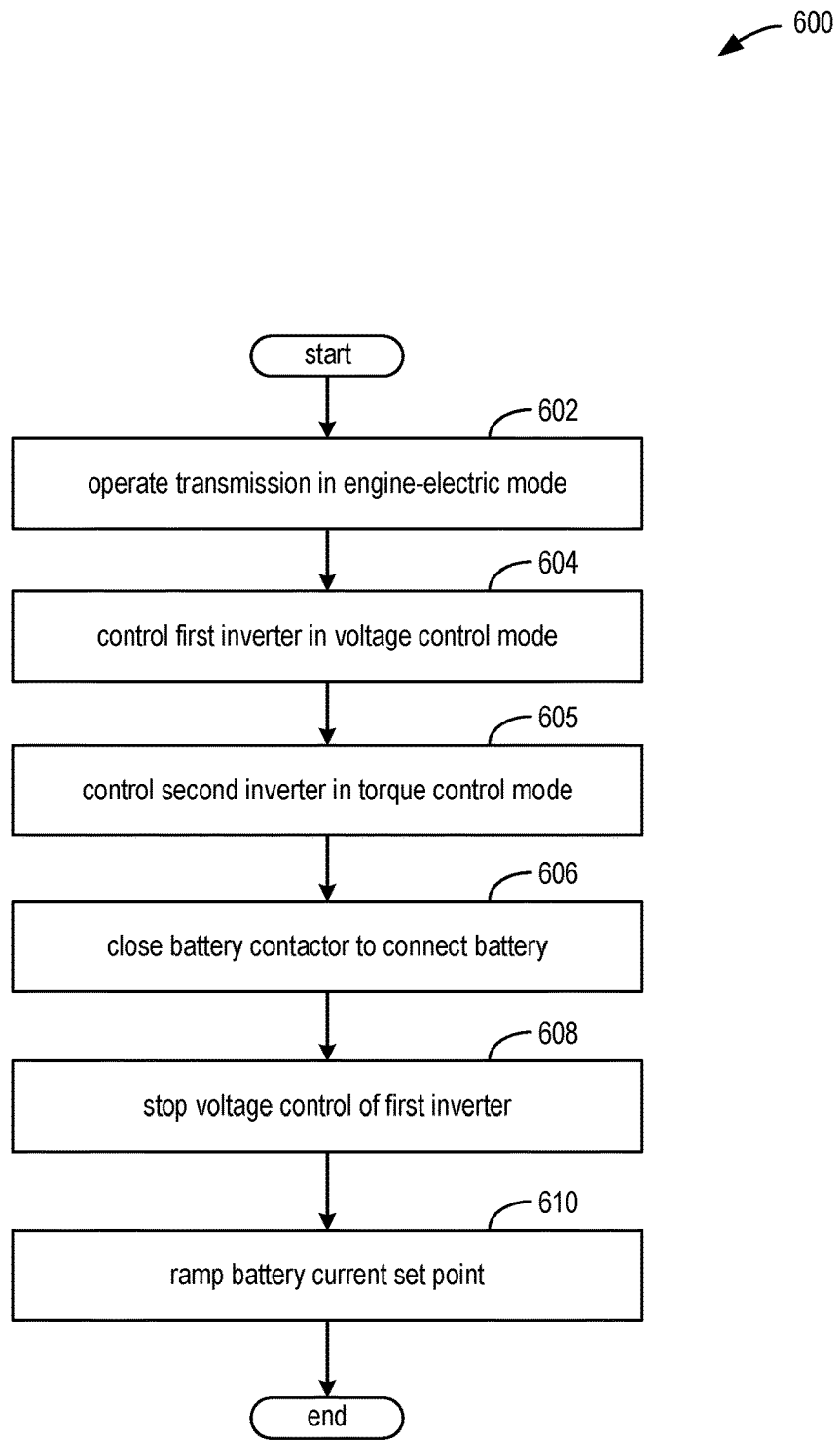
FIG. 6 illustrates a method for transitioning an e-transmission from an engine-electric mode to a hybrid mode.
Figure 7:
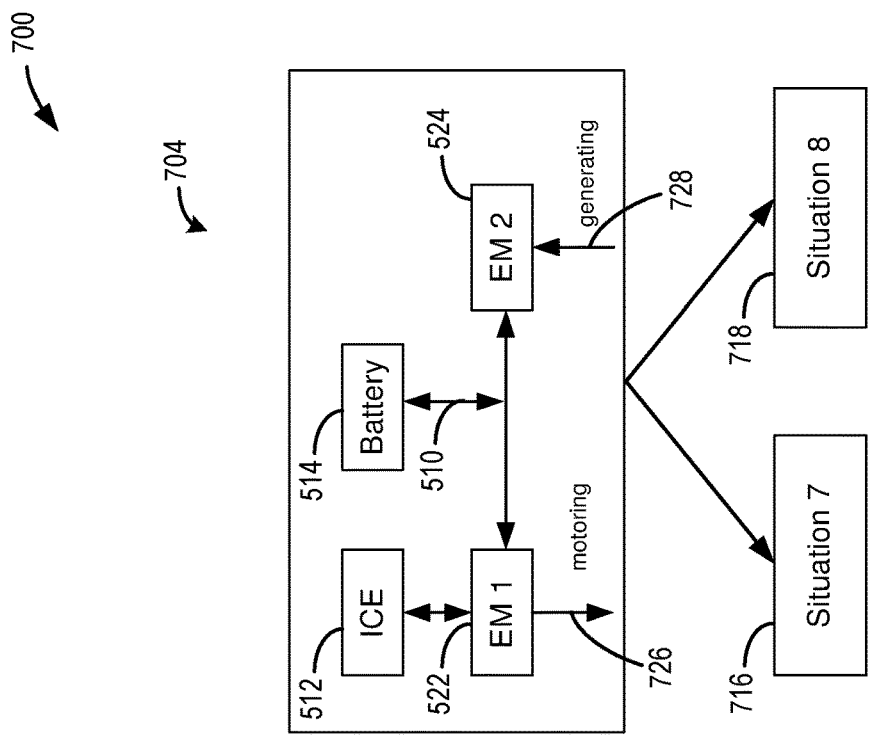
FIG. 7 shows power flows which may occur during transition of an e-transmission from an engine-electric mode to a hybrid mode, such as according to the method of FIG. 6.
Figure 7:
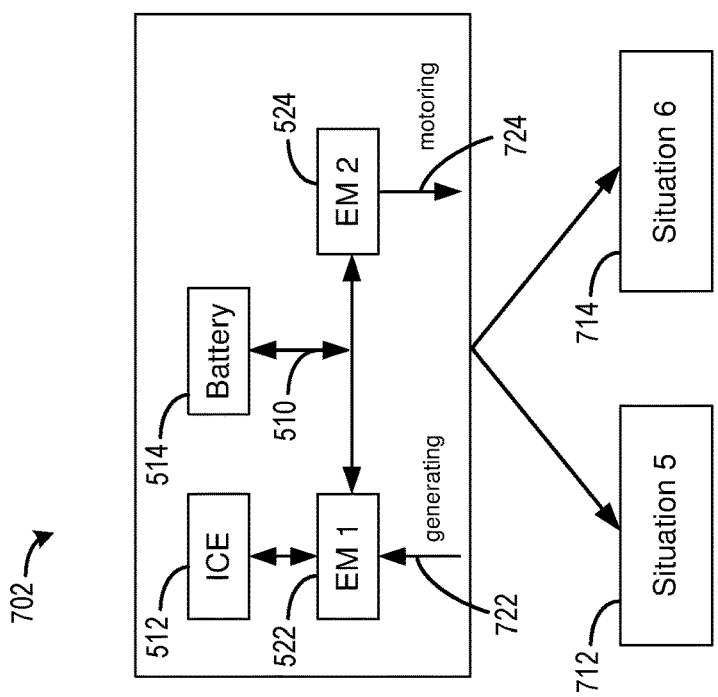
Figure 8:
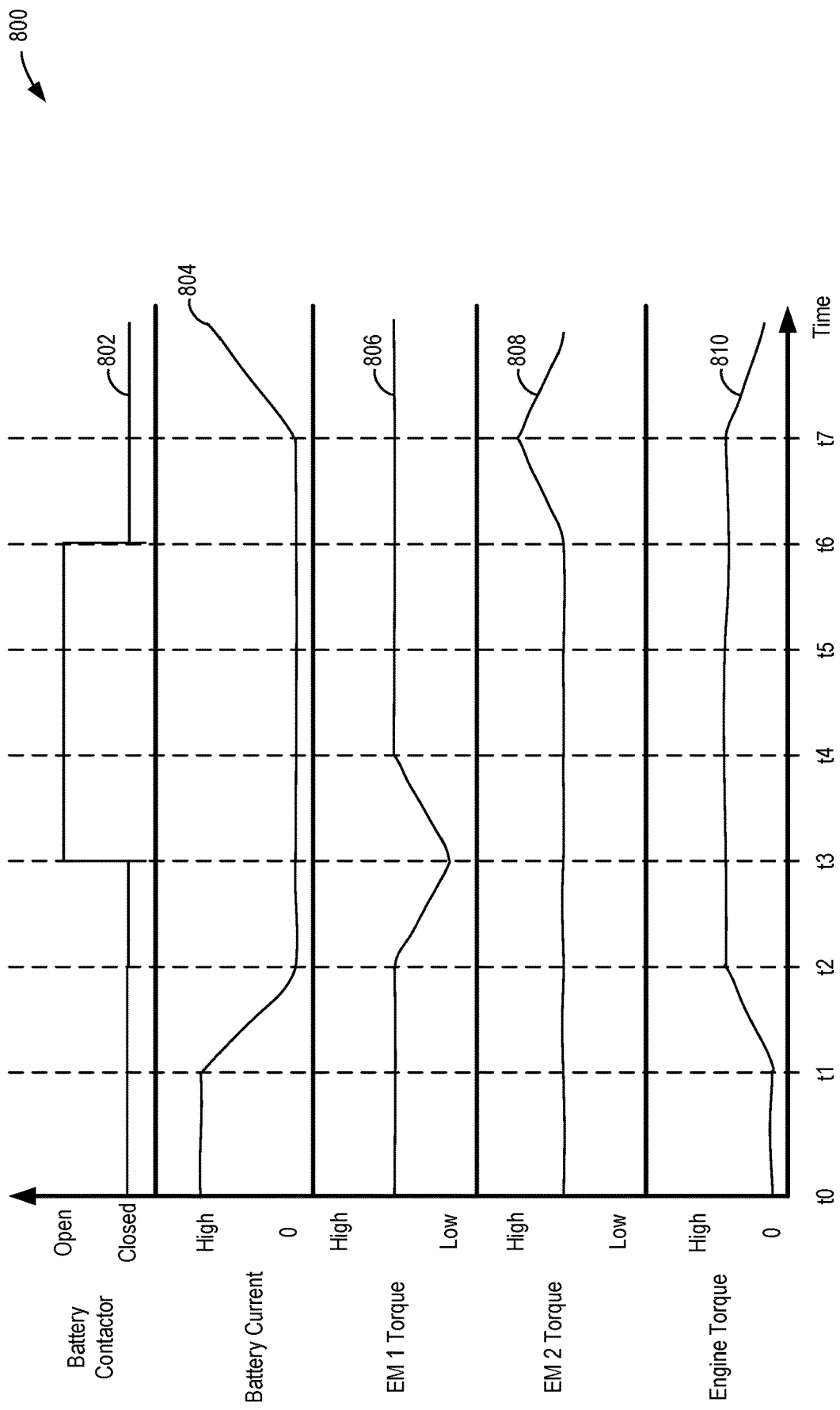
FIG. 8 shows an example timing diagram illustrating variations in voltage, battery current, and battery contactor position during operating mode transitions.

The following description relates to a method for connecting and disconnecting a battery of a transmission during vehicle operation, which may allow for seamless transitions between transmission operating modes without torque interruption during continued operation of the vehicle. FIG. 1 shows a schematic diagram of an electrical drive train (e-drive) of a vehicle in which the method described herein may be implemented. The e-drive of the vehicle may include an e-transmission, as shown in FIG. 2. FIG. 3 shows a schematic diagram of couplings of elements of the e-transmission, including a battery selectively coupled to at least one of a first electric motor and a second electric motor via a battery connector, where each of the first electric motor and the second electric motor have a respective inverter. FIG. 4 illustrates a method for transitioning an e-transmission from a hybrid mode to an engine-electric mode, which may include disconnecting the battery from the electric motors and halting current flow to/from the battery. FIGS. 5A-5B show power flows which may occur during transition of an e-transmission from a hybrid mode to an engine-electric mode, such as according to the method of FIG. 4. FIG. 6 illustrates a method for transitioning an e-transmission from an engine-electric mode to a hybrid mode, which may include connecting the battery to the electric motors and initiating current flow to/from the battery. FIG. 7 shows power flows which may occur during transition of an e-transmission from an engine-electric mode to a hybrid mode, such as according to the method of FIG. 6. FIG. 8 shows an example timing diagram, including electric motor torque, engine torque, and battery current levels during transitions between the hybrid mode and the engine-electric mode.

Turning now to FIG. 1, for a hybrid electric vehicle (HEV), power may be provided to a vehicle's wheels from more than one source, including one or more electric motors. A schematic representation of a vehicle 100 is depicted in FIG. 1 which includes sets of wheels 102 coupled by axles 104 (e.g., pairs of wheels are coupled to one another by the axles 104). It will be appreciated that vehicle 100 is shown in FIG. 1 for illustrative purposes and is a non-limiting example of how an HEV may be configured. Other examples include various arrangements and positioning of components of the vehicle described below as well as additional components not shown in FIG. 1 for brevity.

A drive train 106 of vehicle 100 may include a transmission 108 (e.g., a gear box, gear train, etc.) coupled to one or more of the axles 104 of vehicle 100 via one or more driveshafts 136. The transmission 108 may be coupled to a rear axle via a rear driveshaft and a front axle via a front driveshaft, as shown in FIG. 1, or to one of the front axle and the rear axle, in other examples. The transmission 108 may be mechanically coupled via the driveshafts 136 to a final drive 110 positioned in each of the axles 104 of the drive train 106 which, for example, may be a differential or any other suitable gearing. The transmission 108 and final drive 110 may together translate speed and torque from a rotating source to the vehicle wheels 102 to propel vehicle 100. The present configuration includes at least two transmission input shafts, including a first transmission input shaft 132 coupling a first electric machine 114 and the transmission 108, and a second transmission input shaft 134 coupling a second electric machine 116 and the transmission 108.

When configured as an HEV, the rotating sources may include the first electric machine 114, the second electric machine 116, and an engine 112. The engine 112 may be an internal combustion engine or any other element which may provide rotational power to the transmission shaft. In some examples, and as described herein, the first and second electric machines 114, 116 may be motor/generators, with a capacity to convert electrical energy into mechanical energy and vice versa. As such, the electric machines may hereafter also be referred to as motors and/or generators. The first and second electric machines 114, 116 may be electrically coupled to a traction battery 120 of vehicle 100 to both draw power from the traction battery 120 and provide electrical energy to be stored at the traction battery 120. For example, the traction battery 120 may be a high-voltage battery. In some embodiments, the traction battery 120 may be a generic DC-supply, such as a fuel cell or other power supply. The electric machines may be similarly configured, e.g., having similar operational speed and torque ranges, and thereby referred to as symmetric, or may have different speed and torque outputs, thereby referred to as asymmetric.

Adjustment of the drive train between the various modes, as well as control of operations within each mode, may be executed based on a vehicle control system 124, including a controller 126, as shown in FIG. 1. Controller 126 may be a microcomputer, including elements such as a microprocessor unit, input/output ports, an electronic storage medium for storing instructions, executable programs, and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include sensors at the first and second electric machines 114, 116 to measure motor speed and motor temperature, a pedal position sensor to detect a depression of an operator-actuated pedal, such as an accelerator pedal or a brake pedal, speed sensors at the vehicle wheels 102, and so on. Vehicle acceleration is directly proportional to accelerator pedal position, for example, degree of depression. Upon receiving the signals from the various sensors 128 of FIG. 1, controller 126 processes the received signals, and employs various actuators 130 of vehicle 100 to adjust drive train operations based on the received signals and instructions stored on the memory of controller 126. For example, controller 126 may receive an indication of depression of the brake pedal, signaling a desire for decreased vehicle speed. In response, the controller 126 may command operation of at least one of the electric machines as a generator to recharge the traction battery 120.

In one example, the controller 126 may store instructions in non-transitory memory that, when executed, cause the controller to, control the transmission following methods disclosed herein. In one example, in response to a request to transition the from a first mode to a second mode, the control 126 may control current to and/from the battery (e.g., traction battery 120) to within a non-zero threshold of zero, adjust a voltage setpoint of a first inverter of the first electric motor (e.g., of the first electric machine 114) that is equal to a sum of a voltage of the battery and a voltage difference between the battery and the transmission (e.g., transmission 108), apply a DC current threshold to the first electric motor, and disconnect the battery to the first electric motor and the second electric motor by fully opening a battery contactor in response to DC contactor current less than a threshold current. Thereafter, the controller may restore a nominal voltage setpoint to the first electric motor. In one example, in in the first mode, the battery, the first electric motor, and the second electric motor are used to power rotation of a transmission output shaft, and wherein in the second mode, the engine, the first electric motor, and the second electric motor are used to power rotation of the transmission output shaft.

In the present embodiment, an e-drive is configured to reduce torque interruption during operating mode shifts in a dual motor HEV using a battery contactor positioned between the battery and each of two electric motors. As briefly described above, when vehicle 100 of FIG. 1 is an HEV, drive train 106 includes transmission 108 coupled with the first and second electric machines 114, 116, herein referred to as electric motors, via the first transmission input shaft 132 and the second transmission input shaft 134. A schematic of e-drive 200 shown by FIG. 2 may illustrate the drive train 106 of FIG. 1 for an EV in further detail. It will be appreciated that components of the e-drive 200 having substantially similar function to components of the drive train 106 may be labeled with corresponding numbers, prefixed with a "2" instead of a "1".

Turning to FIG. 2, it shows a schematic of an e-drive 200. According to the exemplary embodiment shown in FIG. 2, a drive system for a vehicle, shown as e-drive 200, includes the engine 112, a transmission 30, a first electromagnetic device (EM1) 208, and the second electromagnetic device (EM2) 210. The axis 206 may act as a central axis for the e-drive 200. The e-drive 200 may be centered about an axis 206, such that the components of the e-drive 200, with exception to components of the power implements, may be centered about and radial with respect to the axis 206. The transmission 30 may be the transmission 108 with reference to FIG. 1. The components of the transmission 30 may be enclosed by a rectangle formed by dashed lines. EM1 208 may be first electric machine 114 and EM2 210 may be the second electric machine 116.

As shown in FIG. 2, the transmission 30 includes a first power transmission device or gear set, shown as power split planetary gear set (PGS) 212, a second power transmission device or gear set, shown as mid-range PGS 214, and a third power transmission device or gear set, shown as low-range PGS 216. In one embodiment, the power-split PGS 212, the mid-range PGS 214, and the low-range PGS 216 are positioned outside of (e.g., on either side of, not between, etc.) the first electromagnetic device EM1 208 and the second electromagnetic device EM2 210. As shown in FIG. 2, one or more of the power-split PGS 212, the mid-range PGS 214, and the low-range PGS 216 are disposed between (e.g., sandwiched by, etc.) the first electromagnetic device EM1 212 and the second electromagnetic device EM2 214.

The transmission 30 includes a shaft, that may be referred to herein and act as a connecting shaft 220. A clutch 222 may be a neutral clutch and is positioned to selectively couple the engine 112 to connecting shaft 220. The clutch 222 may be a component of the engine 112, a component of the transmission 30, or a separate component. According to an exemplary embodiment, the first clutch 222 and connecting shaft 220 may directly couple the engine 112 to the power-split PGS 212. In one embodiment, the clutch 222 and connecting shaft 220 may directly couple the engine 112 with a ring gear 256 of the power-split PGS 212. According to an alternative embodiment, the clutch 222 may be omitted, and connecting shaft 220 is directly coupled to the engine 112. The connecting shaft 220 may be drivingly coupled to the power-split PGS 212.

The connecting shaft 220 may drivingly couple the engine 112 to a first power take off (PTO) 226. The first PTO 226 may be used transfer torque from the engine 112 to drive or actuate an implement that may be drivingly coupled to the first PTO 226. A first gear 228 may be drivingly coupled to the connecting shaft 220. The first gear 228 may mesh and drivingly couple with a second gear 230. The second gear 230 may act as an input gear for and be drivingly coupled to the first PTO 226 via an input 229. When clutch 222 is engaged, the engine 112 may be drivingly coupled and supply rotational energy via torque to the first PTO 226 via the first gear 228 and second gear 230. The first PTO 226, second gear 230, and input 229 may be centered about an axis parallel with axis 206.

The transmission 30 includes a second clutch 224. The second clutch 224 may be an input coupled clutch. The second clutch 224 is positioned to selectively couple the EM2 210 with the engine 112 and the connecting shaft 220, according to an exemplary embodiment. The second clutch 224 may also selectively couple the engine 112 to the mid-range PGS 214. As shown in FIG. 2, the connecting shaft 220 extends from the first clutch 222, through the input coupled second clutch 224 and the EM2 210, and through the mid-range PGS 214 and the low-range PGS 216 to the power-split PGS 212. The second clutch 224 may selectively couple the EM2 210 with connecting shaft 220. Accordingly, the first clutch 222 may selectively couple the connecting shaft 220 to a first sun gear 232 of the mid-range PGS 214.

The transmission 30 may have a first shaft and a second shaft that may act as a first input 231 and a second input 233. The connecting shaft 220 may form into or be drivingly coupled the first input 231 of the transmission 30. The connecting shaft 220 may drivingly couple to the second input 233 of the transmission 30 via the second clutch 224. The first input 231 may drivingly couple to the power-split PGS 212. The second input 233 may drivingly couple to the mid-range PGS 214.

The mid-range PGS 214 may be formed of the first sun gear 232, a plurality of first planetary gears 234 and a first ring gear 236. The plurality of first planetary gears 234 may be supported by a first carrier 238. The first ring gear 236 may be drivingly coupled to, join to, or formed from a second carrier 240. The second input 233 may drivingly couple, join, or form into the first sun gear 232.

The low-range PGS 216 may be formed of a second sun gear 242, a plurality of second planetary gears 244 and a second ring gear 246. The plurality of second planetary gears 244 may be supported by a third carrier 248. The second ring gear 246 may be drivingly couple to, joined to, or formed from a fourth carrier 250.

The power-split PGS 212 may be formed of a third sun gear 252, a plurality of third planetary gears 254 and a third ring gear 256. The plurality of third planetary gears 254 may be supported by a fifth carrier 258. The ring gear 256 may be drivingly coupled to or formed from a sixth carrier 260. The first input 231 may drivingly couple, join, or form into the sixth carrier 260.

The transmission 30 may have a first shaft and a second shaft that may act as a first output 262 and a second output 264, respectively. The second output 264 may be located about the first output 262. The first output 262 may be drivingly coupled to a coupling 266, such as a flange, that may drivingly couple to a rotational element. The first output 262 extends from the power-split PGS 212, through the EM1 208, and to the coupling 266. The transmission 30 may further include a third clutch 270. The second output 264 may drivingly couple to a second power takeoff (PTO) 268 via the third clutch 270.

The transmission 30 further includes a second clutch 263 or brake. The second clutch 263 may be an output coupled clutch. The second clutch 263 may be drivingly coupled to the low-range PGS 216 via the third carrier 248. The second clutch 263 may be positioned to selectively inhibit movement of the third carrier 248 (e.g., by lockingly coupling the third carrier 248 to a housing of the transmission 30), according to an exemplary embodiment. Therein, the second clutch 263 may act as a brake, or low brake, for the low-range PGS 216. When the movement of the third carrier 248 is limited (e.g., prevented), the second sun gear 242 may be drivingly coupled to the second ring gear 246 through the plurality of second planetary gears 244 such that a rotation of the second sun gear 242 causes a corresponding rotation of the second ring gear 246. Accordingly, second clutch 263 may thereby selectively couple the first ring gear 236 and second carrier 240 to the third carrier 248. The second clutch 263 may drivingly couple the first ring gear 236 and the mid-range PGS 214 to the low-range PGS 216.

The transmission 30 includes a brake 265, shown as a mid-brake for the mid-range PGS 214. The brake 265 may be drivingly coupled to the mid-range PGS 214 via the second carrier 240. The brake 265 is positioned to selectively inhibit the movement of at least a portion of the mid-range PGS 214, such as the first ring gear 236, according to an exemplary embodiment. In one embodiment, the output brake 265 is biased into a disengaged position (e.g., with a spring, etc.) and selectively engaged (e.g., with application of pressurized hydraulic fluid, etc.). In other embodiments, the output brake 265 may be hydraulically-biased and spring released. In still other embodiments, the components of the transmission 30 are still otherwise engaged and disengaged (e.g., pneumatically, etc.). The brake 265 may therein, drivingly couple the mid-range PGS 214 to the power-split PGS 212, wherein rotational energy via torque may be transferred from first planetary gears 234 to the first carrier 238 and from the first carrier 238 to the fifth carrier 258.

By way of example, the output brake 265 and the second clutch 263 may be engaged simultaneously. For this example, providing a driveline brake such that rotational movement of at least one of the elements of the low-range PGS 216 (e.g., the second sun gear 242, the second planetary gears 244, the second ring gear 246, and the third carrier 248), elements of the mid-range PGS 214, (e.g., the first ring gear 236, etc.), the power-split PGS 212 (e.g., the fifth carrier 258, etc.), and the first output 262 may be selectively limited, such that their rotation about axis 206 is prevented.

The fifth carrier 258 may be drivingly coupled to a first output 262. The first carrier 238, fourth carrier 250, and fifth carrier 258 may be drivingly coupled and/or formed from the same body and may act as a singular unit. The first ring gear 236, second carrier 240, and second sun gear 242 may all be drivingly coupled and/or formed from the same body and may act as a singular unit. The first input 231, sixth carrier 260, and third ring gear 256 may be drivingly coupled and/or formed from the same body and may act as a singular unit.

The third sun gear 252 may be drivingly coupled to or formed from a second output 264. The second output 264 may be drivingly coupled to or form a third gear 272. The third gear 272 may mesh with and drivingly couple to a fourth gear 274. The coupling 266 may be drivingly coupled to the third gear 272. The fourth gear 274 may be selectively coupled to the third clutch 270 and act as a second input gear for the second PTO 268. The third clutch may drivingly couple to the input 276 of the second PTO 268.

For an example, when clutch 222 is engaged, the input 276 may drivingly couple to the fourth gear 274. For this example, the second output 264 and EM1 208 may drivingly couple and transfer torque to the second PTO 268 via a reduction set formed by the third gear 272 and fourth gear 274. The second PTO 268 may be used transfer torque from the engine 112 and/or EM1 208 to drive or actuate an implement that may be drivingly coupled to second PTO 268. The second PTO 268, third clutch 270, fourth gear 274, and input 276 may centered on an axis parallel with axis 206.

The EM1 208 may be formed of a first rotor 282 and a first stator 284. The EM2 may be formed of a second rotor 286 and a second stator 288. The first rotor 282 may be drivingly coupled to the second output 264. EM1 208 may add rotational energy in the form of torque to the second output 264 to drive the second PTO. The second output 264 may be drivingly coupled, joined, or formed from the rotor 282. The EM2 210 may add rotational energy in the form of torque to the second input 233 to drive the first sun gear 232. The second input 233 may be drivingly coupled, joined, or formed from the rotor 286.

A schematic of e-drive 300 shown by FIG. 3 may illustrate an arrangement of elements of the drive train 106 of FIG. 1 for an EV (and therefore, e-drive 200 of FIG. 2) in further detail. The first electric machine 114 and the second electric machine 116 of FIGS. 1-2 are labeled as EM1 208 and EM2 210, respectively. EM1 208 may include or be coupled to a first inverter (INV1) 312 and EM2 may include or be coupled to a second inverter (INV2) 314 for converting DC current from the battery into useable AC current. A high voltage source (HV source) 316 may be selectively coupled to EM1 208 and EM2 210 via a contactor 322. In one example, the HV source 316 may be a high voltage battery and the contactor 322 may be a battery contactor. In other examples, the HV source may be a fuel cell, or other high voltage source. When the contactor 322 is closed, current may flow to/from the HV source 316. When the contactor 322 is open, current flow to/from the HV source 316 may be halted. E-drive 300 may further include a second contactor 324, which may be closed during operation of the vehicle, such as the vehicle 100 with reference to FIG. 1, and may open if degradation to the HV source 316 is detected, such as overloading of battery storage. The HV source 316 may be further coupled to auxiliary loads (AUX loads) 332 such as a cabin heating/cooling system, entertainment system, and so on.

As described above, a hybrid transmission, such as transmission 30 with reference to FIG. 1-2, may operate in different modes using different energy sources depending on parameters such as fuel level, energy level, road conditions, driver demand, and so on. In an engine-only mode or an engine-electric mode, the battery may not be used and at least one electric motor may be used to power rotation of an output shaft of the transmission. It is desirable for the battery to connect/disconnect during operation (e.g., transitioning from hybrid mode to engine-electric mode) without interrupting mechanical transmitted power/torque delivered by transmission (e.g., without shutting down the vehicle to disconnect/connect the battery at shutdown/startup, or vehicle going to torque free state where current is close to zero), and without (significant) current going through battery contactors, such as the battery contactor 322, at the moment of (dis)connect. It is also desirable for the transmission to handle auxiliary loads on the DC-bus of the transmission (e.g., if current feedback is available). In addition, it is desirable to maintain high voltage DC (HVDC) bus voltage, and avoid large voltage dips or peaks, to allow proper inverter (and other apparatuses connected to the HVDC bus) operation.

Described herein are methods and systems for a transmission, including a high voltage (HV) battery (e.g., DC-supply), such as HV source 316, with a battery contactor, such as contactor 322, selectively coupling the HV battery to auxiliary loads and a first inverter and a second inverter, such as the first inverter 312 and second inverter 314, respectively. A second contactor, such as second contactor 324, may be positioned between a first arm of the battery contactor to selectively couple the HV battery to the first inverter and the second inverter, each of the first inverter and the second inverter may be coupled to a first electric motor and a second electric motor, respectively, such as EM1 208 and EM2 210, respectively, and with reference to FIG. 2. The transmission further includes an engine, such as engine 112 with reference to FIGS. 1-2, coupled to the first electric motor, such as EM1 208 with reference to FIG. 2.

The disclosure may be applied to any transmission layout including a DC-bus where a motor/inverter may be placed in a voltage control mode. An engine may be a combustion engine or any power source providing rotational power to a shaft of the transmission. The battery may be a high-voltage traction battery or a generic DC power source, such as a fuel cell, a power supply, and so on. The disclosure includes an approach for DC power connection control comprising, adjusting voltage on an inverter of an electric motor, e.g., one of EM1 208 and EM2 210, prior to disconnecting or connecting a battery contact, e.g., battery contactor 322, in response to a transition between a first mode and a second mode. In the first mode, a battery, e.g., HV source 316, and at least the electric motor are used to power rotation of a transmission output shaft, e.g., first output 262, second output 264. In the second mode, an engine and at least the electric motor are used to power rotation of the transmission output shaft. In one example, the first mode may be a hybrid mode and the second mode may be an engine-electric mode.

For context, when the battery is connected, the battery determines the HVDC voltage, and the transmission controls the current. When the battery is disconnected, the HVDC contactor current is 0, and the inverters can control the voltage. With battery connected, the transmission can control the power from the battery by controlling the HVDC contactor current. With battery disconnected, the power balance between the electric machines can be controlled by voltage control.

Transitioning from the first mode or hybrid mode to the second mode or engine-electric mode includes disconnecting the battery from the first inverter and the second inverter of the first electric motor and the second electric motor, respectively, thus halting transmission of current to and from the battery. FIG. 4 illustrates a method 400 for transitioning a hybrid transmission, such as the transmission described with respect to FIGS. 1-3, from the hybrid mode to the engine-electric mode. The method 400 will be described herein with respect to the hybrid transmission of FIG. 1-3, however the method 400 may be implemented in other hybrid transmissions that include a battery, a first electric motor, and a second electric motor, without departing from the scope of this disclosure.

At 402, the method 400 includes operating the transmission in the first mode. As described above, operating the transmission in the first mode, herein referred to as a hybrid mode, includes flowing power from the battery to at least one of the first electric motor and the second electric motor such that an electric motor of the first electric motor and the second electric motor that is receiving power from the battery may provide rotational energy to the transmission. In the hybrid mode, power may come from anywhere, including the engine, which may be an internal combustion engine or other element which provides rotational power to a shaft of the transmission.

At 404, the method 400 includes controlling current to and from the battery to within a non-zero threshold of zero. For example, current to and from the battery may be controlled to a threshold that guarantees a long lifetime of the contactors, such as, for example, less than 5 amps. In some examples, the battery may be controlled based on one or more conditions. For example, in a first situation with reference to FIG. 3, where the auxiliary loads 332 are powered by the HV source 316, current to the contactor 322 may be controlled to close to zero by ensuring the DC current/power between first inverter 312 and second inverter 314 are equal. In such an example, the contactor 322 may remain connected/closed. In a second situation, where the auxiliary loads 332 are driven by the transmission, the second contactor 324 may remain connected/closed to ensure the DC current/power between the inverters is not identical but has an offset to compensate for the auxiliary loads by controlling current through contactor 322 is close to zero.

When current to/from the battery is controlled to zero, DC current from one inverter to the other may be approximately equal (e.g., from the first inverter of the first electric motor, such as first inverter 312 and EM1 208, respectively, of FIG. 3, to the second inverter of the second electric motor, such as second inverter 314 and EM2 210, respectively, of FIG. 3, and vice versa). Current flow between the first inverter and the second inverter are further described with respect to FIGS. 5A-5B.

At 405, the method 400 includes activating the engine, such as the engine 112 of FIG. 1-2, to compensate for a change in load that occurs when current to/from the battery is halted. For example, air flow and/or fuel provided to the engine may start or be increased.

At 406, the method 400 includes controlling a first inverter (e.g., of the first inverter and the second inverter) in a voltage control mode. Voltage control may include establishing a voltage setpoint for the inverter and further includes applying a DC current threshold (e.g., a DC current limit) and/or a torque threshold. In voltage control mode, whichever inverter/motor is in the mode will keep the DC bus stable at the voltage setpoint and the inverter regulates current and/or torque to maintain the voltage setpoint. In one example, controlling the first inverter in voltage control has prerequisites including determining the voltage setpoint and applying the DC current threshold. Once confirmed (from inverter feedback) that the DC current threshold is active, the method 400 may include switching from the first inverter to voltage control.

In one example, which inverter is the first inverter may be determined based on the power flow through the drive controlling electrical degree of freedom, or in other words, which motor is exercising current control. Depending whether the current-controlling motor is motoring or generating, the voltage setpoint (respectively below or above the voltage of the HVDC battery) may be determined. The voltage setpoint may be a setpoint where a nominal operation for the electric machines may occur. Different operations, which may be referred to as situations, of voltage control may occur when voltage is above or below a voltage setpoint, or when a voltage is between two of a plurality of voltage setpoints. In one example, the voltage setpoint may be a sum of the voltage of the battery and a voltage offset. In one example, the voltage setpoint may be a first voltage setpoint that is set above the voltage of the battery. In another example, the voltage setpoint may be a second voltage setpoint that is set below the voltage of the battery. In one example the voltage offset is determined based on power flow, including whether the voltage controlling motor is motoring (negative offset) or generating (positive offset), and noise and/or nominal deviations from the voltage setpoint on the HVDC bus (e.g. because of the battery's internal resistance). For example, the voltage offset may a large enough offset for the first inverter to not achieve the voltage setpoint and work against the DC current threshold, but not too large so to limit the voltage dip or increase once the battery is disconnected.

In one example, the DC current threshold is applied to the current controlling motor, the value of which is equal to the DC current of the second motor that is controlled in torque control (e.g., see below) plus other DC loads. In other words, the DC current threshold limits the first inverter to provide no more DC current (or no more power) than requested. Applying the DC current threshold may result in DC contactor current less than a threshold current, such as a non-zero threshold of zero. In one example, allowed DC current during the transition may be dependent on hardware requirements of the contactor. In one example, the method may include applying the DC current threshold and determining whether the DC current of the inverter is active prior to controlling the first inverter in voltage control.

At 407, the method 400 includes controlling a second inverter (e.g., of the first inverter and the second inverter) in torque control mode. Torque control mode may include establishing a torque setpoint for the inverter. For example, the torque setpoint may be the torque demand before the request to transition from the first mode to the second mode. In torque control mode, whichever inverter is in the mode will keep the torque stable at the torque setpoint and the inverter regulates current thereby maintaining a torque output at torque setpoint. In other examples, the second inverter may be controlled in speed control mode and similarly adjusted to maintain a respective setpoint.

At 408, the first inverter adjusts current to target the voltage setpoint. For example, both of the first electric motor and the second electric motor continue functioning (e.g., each as one of a motor or a generator) to the implemented voltage control threshold. For example, the method may include commanding over the CAN bus (e.g., included in the control system 124) the voltage setpoint of the motor (of the first motor and the second motor) and an internal controller of the inverter executing feedback control to obtain the setpoint. For example, based on whether the motor of voltage commanded inverter is generating or motoring, the inverter may increase voltage up to the setpoint or reduce voltage down to the setpoint, respectively. In one example, the voltage controlled motor will target the voltage setpoint, but is intended not to reach it, as it will be running against the inverter DC current limit, e.g., the DC current threshold, (until the contactor opens). As further described with respect to FIGS. 5A-5B, voltage control may allow the transmission to transition from the hybrid mode to the engine-electric mode without torque interruption. For example, the transmission may transition from the hybrid mode to the engine-electric mode by disconnecting the battery from the transmission, therefore decoupling the battery from the first electric motor and the second electric motor.

If it is confirmed at 410 that the DC contactor current is low, e.g., less than a threshold current, battery disconnect is allowed at 412. Additionally, in some examples, battery disconnect includes confirming that the preceding sequence and conditions are fulfilled, e.g., the inverter is in voltage control following application of the DC current threshold, and the execution of which results in low DC contactor current. If it is determined at 410 that the DC contactor current is not low, the method 400 adjusts current to the first motor at 408.

At 412, the method 400 includes fully opening the battery contactor to disconnect the battery from the transmission. The second contactor may be optionally opened at 414. As described at operation 406, the inverter is under voltage control prior to disconnection of the battery via fully opening of the battery contactor, therefore the inverter may have a stable DC-bus voltage.

At 416, the method 400 includes removing the DC current threshold from the first inverter, e.g., the voltage controlled inverter, and restoring the voltage setpoint of the first inverter to the nominal operating point for engine-electric operation. In some examples, the method may include confirming, e.g., prior to removing the current limit, that the DC contactor is open.

Adjusting the voltage setpoint and applying the thresholds may allow disconnection of the battery without torque interruption. For example, the voltage setpoint, torque setpoint, and DC current threshold may be applied, and voltage generated by the electric motor operating as a generator may be used by the motor operating as a motor, respectively, while the battery is connected. The inverter selected for voltage control, including the voltage setpoint, and the inverter selected for torque control, including the torque setpoint, may be synchronously set, pending which of the first electric motor and the second electric motor are operating as a motor and as a generator. Further, the inverter selected for voltage control may be set pending approach to an upper or lower voltage threshold, as further described herein.

In this way, the method 400 may allow for seamless transmission from the hybrid mode to the engine-electric mode, where the transition is free of torque interruption. Additionally, applying a DC current threshold (e.g., via voltage control) instead of a torque threshold or torque limit may allow the transmission to compensate for inverter loss. DC current levels (e.g., relative to a DC current threshold) may be estimated based on at least one of torque, speed, and phase current, and/or may be measured based on DC-link current.

Turning now to FIGS. 5A-5B, a schematic representation 500 of a transition from the hybrid mode to the engine-electric mode is shown. FIGS. 5A-5B may represent the method 400 described with respect to FIG. 4, and will be described with respect to the transmission of FIGS. 1-3, such that elements of FIGS. 5A-5B which are equivalent to those of FIGS. 1-3 are similarly numbered.

FIG. 5A shows a first power state 502 of the transmission, wherein the transmission is operating in the hybrid mode. An ICE (e.g., the engine 112 of FIG. 1) may not be contributing power to the transmission. The ICE may be represented by engine 512 in schematic representation 500. A battery 514 is contributing power to both a first electric machine (EM1) 522 and a second electric machine (EM2) 524 via a respective first inverter and second inverter (not shown). Thus, the transmission as operated according to the first power state 502 may be considered that of a battery electric vehicle (BEV). Power may be flowing both into and out of the first electric machine 522 and the second electric machine 524. The battery 514 may be the HV source 316 with reference to FIG. 3. The first electric machine 522 and second electric machine 524 may be the first and second electric machines 208, 210, respectfully, with reference to FIG. 2-3.

When transitioning from the hybrid mode to the engine-electric mode, as described at operation 404 of the method 400, current to and from the battery may be controlled to within a threshold of zero and a decrease in load may be compensated for by activating the engine (e.g., the ICE). For example, current to and from the battery may be controlled a threshold that guarantees a long lifetime of the contactors, such as, for example, less than 5 amps. Although current to and from the battery is controlled to zero, an arrow 510 may be included in subsequent power flows to indicate the battery 514 is coupled to the transmission (e.g., the battery contactor is closed). The first electric machine 522 and the second electric machine 524 may each be independently operated as a motor or as a generator. Thus, two power flow options may be available from the first power state 502. In a first power flow 504, the first electric machine 522 is functioning in a generating mode and is generating power. The second electric machine 524 is functioning as a motor and is contributing power to the drive shaft of the transmission. In a second power flow 506, the first electric machine 522 functions in a motoring mode and the second electric machine 524 functions in a generating mode. In both the first power flow 504 and the second power flow 506, the transmission may be considered that of a hybrid electric vehicle (HEV), as power is provided to the drive shaft by at least one electric motor (e.g., either the first electric machine 522 or second electric machine 524) and the engine 512 (e.g., the ICE).

The first power flow 504 and the second power flow 506 are further described with respect to FIG. 5B. As described with respect to operation 406 of the method 400, transitioning from the hybrid mode to the engine-electric mode includes applying voltage control (e.g., voltage leveling) to an inverter of an electric motor. Voltage control may be applied to either of the electric motors via the respective inverter (not shown); in other words, voltage control may be applied to the electric motor operating as a motor or operating as a generator. The battery 514 is still connected to the transmission, and current to/from the battery, via arrow 510, is controlled to zero, when voltage control is applied to an inverter. Four situations will now be described, where voltage control is applied to each of the first electric motor or the second electric motor in the first power flow 504 and the second power flow 506.

As described above, in the first power flow 504, the first electric machine 522 is operated as a generator and the second electric machine 524 is operated as a motor. In a first situation 542 (e.g., situation 1), voltage control may be applied to the first electric machine 522, as further described herein. When current to and from the battery, via arrow 510, is controlled to zero, DC current from one inverter to the other is approximately equal. For example, DC current 552 of the first electric machine 522 (e.g., DC current EM1), which is operated as a generator, is equal to DC current 554 of the second electric machine 524 (e.g., DC current EM2), which is operated as a motor. Voltage control is applied to the first electric motor (e.g., voltage control mode), which may include setting a first DC current threshold wherein the first inverter may generate no more power/DC current than requested and setting the voltage setpoint for the first electric motor. For example, the voltage setpoint for the first electric motor operating as a generator may be represented by:

voltage setpoint=Vbat+Voffset where Vbat is voltage of the battery and Voffset a voltage difference between the battery and the DC bus of the transmission. Power generated by the second electric machine 524 may be equal to the power generated by the second electric machine 524 prior to voltage control of the first electric machine 522. When the first electric machine 522 is voltage controlled, the first electric machine 522 may generate (e.g., increases voltage) up to the voltage setpoint (e.g., the voltage setpoint as described with respect to method 400). The second electric machine 524 may continue functioning as a motor. When the sequence and conditions are fulfilled, e.g., the voltage setpoint established, the DC current threshold applied, and the first electric machine voltage controlled, the battery may be disconnected by opening the battery connects, as described with respect to the method 400 of FIG. 4. In other words, the battery may disconnected when the HVDC contactor current is sufficiently low. The transmission may operate in the engine-electric mode and voltage setpoint is set to the nominal operating point of the inverters.

In a second situation 544 (e.g., situation 2) of the first power flow 504, voltage control may be applied to the second electric machine 524, as further described herein. When current to and from the battery is controlled to zero, DC current from one inverter to the other is approximately equal. For example, DC current 552 of the first electric machine 522 (e.g., DC current EM1), which is operated as a generator, is equal to DC current 554 of the second electric machine 524 (e.g., DC current EM2), which is operated as a motor. Voltage control is applied to the second electric machine 524, which may include setting a second DC current threshold wherein the second inverter may request no more power/DC current than generated and setting a voltage setpoint for the second electric machine 524. For example, the voltage setpoint for the second electric machine 524 operating as a motor may be represented by:

voltage setpoint=Vbat−Voffset where Vbat is voltage of the battery and Voffset a voltage difference between the battery and the DC bus of the transmission. Power generated by the first electric machine 522 may be equal to the power generated by the first electric machine 522 prior to voltage control of the second electric machine 524. When the second electric machine 524 is voltage controlled, the second electric machine 524 may motor (e.g., reduce voltage) to the voltage setpoint. The first electric machine 522 may continue functioning as a generator. The second electric machine 524 targets the voltage setpoint but is intended not to reach it as it is running against the inverter DC current limit (e.g., the DC current threshold) until the contactor opens. When the sequence and conditions are fulfilled such that the DC current through the contactor is low (e.g., zero), the battery 514 may be disconnected by opening the battery contactors, as described with respect to the method 400 of FIG. 4. The transmission may operate in the engine-electric mode and voltage setpoint is set to the nominal operating point of the inverters.

As described above, in the second power flow 506, the first electric machine 522 is operated as a motor and the second electric machine 524 is operated as a generator. In a third situation 546 (e.g., situation 3), voltage control may be applied to the first electric machine 522, as further described herein. When current to and from the battery, via arrow 510, is controlled to zero, DC current from one inverter to the other is approximately equal. For example, DC current 556 of the first electric machine 522 (e.g., DC current EM1), which is operated as a motor, is equal to DC current 558 of the second electric machine 524 (e.g., DC current EM2), which is operated as a generator. Voltage control is applied to the first electric machine 522, which may include setting a third DC current threshold wherein the first inverter may request no more power/DC current than generated and setting a voltage setpoint for the first electric machine 522. For example, the voltage setpoint for the first electric machine 522 operating as a motor may be represented by:

voltage setpoint=Vbat−Voffset where Vbat is voltage of the battery and Voffset is a voltage difference between the battery and the DC bus of the transmission. Power generated by the second electric machine 524 may be equal to the power generated by the second electric machine 524 prior to voltage control of the first electric machine 522. When the first electric machine 522 is voltage controlled, the first electric machine 522 may motor (e.g., reduce voltage) to the voltage setpoint. The second electric machine 524 may continue functioning as a generator. As described above, when the DC contactor current is low (e.g., zero or nearly zero) resulting from executing the sequence and conditions described above, the battery may be disconnected by opening the battery connects, as described with respect to the method 400 of FIG. 4. The transmission may operate in the engine-electric mode and the voltage setpoint may be restored to a nominal setpoint for best system performance.

In a fourth situation 548 (e.g., situation 4) of the second power flow 506, voltage control may be applied to the second electric motor, as further described herein. When current to and from the battery is controlled to zero, DC current from one inverter to the other is approximately equal. For example, DC current 556 of the first electric machine 522 (e.g., DC current EM1), which is operated as a motor, is equal to DC current 558 of the second electric machine 524 (e.g., DC current EM2), which is operated as a generator. Voltage control is applied to the second electric machine 524, which may include setting a fourth DC current threshold wherein the second inverter may generate no more DC current than requested and setting a voltage setpoint for the second electric machine 524. For example, the voltage setpoint for the second electric machine 524 operating as a generator may be represented by:

$$\text{voltage setpoint} = V_{bat} + V_{offset}$$

where Vbat is voltage of the battery and Voffset a voltage difference between the battery and the DC bus of the transmission. Power generated by the first electric machine 522 may be equal to power generated by the first electric machine 522 prior to voltage control of the second electric machine 524. When the second electric machine 524 is voltage controlled, the second electric machine 524 may generate (e.g., increase voltage) to the voltage setpoint. The first electric machine 522 may continue functioning as a motor. As above, when the DC contactor current is low (e.g., zero or nearly zero), the battery may be disconnected by opening the battery connects, as described with respect to the method 400 of FIG. 4. The transmission may operate in the engine-electric mode and the voltage setpoint may be restored to a nominal setpoint for best system performance.

In this way, the transmission may be transitioned from the hybrid mode to the engine-electric mode according to a situation of the first through fourth situations (e.g., for different electric motor operations) without torque interruption. At high battery voltage, e.g., battery voltage greater than a first threshold voltage, the control strategies described with reference to the second situation 544 of the first power flow 504 and the third situation 546 of the second power flow 506 may be preferred. For example, as a first control strategy, setting voltage setpoints that are below voltage of the battery may be implemented (e.g., when voltage control is implemented on the electric motor that is motoring), which may prevent total voltage of the transmission from increasing to a system voltage upper threshold. For example, the system voltage upper threshold may be a voltage above which elements of the transmission and/or the battery may be degraded due to an excess of power. The desired system voltage upper threshold may be, for example, 750V. Similarly, in an example where the battery voltage is low, the control strategies described with reference to the first situation 542 and the fourth situation 548 may be selected as a second control strategy, which may prevent total voltage of the transmission from decreasing below a system voltage lower threshold. For example, it may be disadvantageous to set the voltage setpoint lower than a second threshold voltage, e.g., a lower threshold or minimum.

Transitioning from the first mode, e.g., the engine-electric mode, to the second mode, e.g., the hybrid mode, includes connecting the battery to the transmission such that current, via arrow 510, may flow between the battery, the first electric machine 522, and the second electric machine 524 via the first inverter and the second inverter, respectively. In the hybrid mode, the vehicle may be powered by the engine and at least one electric motor, with energy supplied to the at least one electric motor by the battery. FIG. 6 illustrates a method 600 for transitioning a hybrid transmission, such as the transmission described with respect to FIGS. 1-3, from the engine-electric mode to the hybrid mode. The method 600 will be described herein with respect to the hybrid transmission of FIG. 1-3, however the method 600 may be implemented in other hybrid transmissions which include a battery, a first electric machine 522, and a second electric machine 524, without departing from the scope of this disclosure At 602, the method 600 includes operating the transmission in the engine-electric mode. When operating the transmission in the engine-electric mode, an inverter (e.g., of the first electric motor or the second electric motor, such as the first electric machine 522 or second electric machine 524) may control voltage on the DC-bus. Further, the battery, such as battery 514 and/or HV source 316, may be disconnected from the transmission where the battery contactor, such as battery contactor 322, is open and current, via arrow 510, flow to and from the battery is halted. Power may be provided in part by the engine (e.g., an ICE or other element which provides rotational power to a shaft of the transmission, such as engine 512 and/or engine 112).

At 604, the method 600 includes controlling a first inverter (e.g., the first electric motor or the second electric motor) in voltage control mode. In one example, the voltage control mode may include establishing a voltage setpoint for the inverter and applying a DC current threshold or torque threshold to prepare for connection of the battery. For example, the voltage setpoint may be applied to the entirety of the transmission and may be dependent on which inverter the voltage control is applied to (e.g., of an electric machine operating as a motor or as a generator). The voltage control mode may be applied to either of the first electric motor or the second electric motor when operating as a motor or as a generator. Further detail of adjusting the voltage setpoint and applying the DC current threshold is described with respect to FIG. 7.

At 605, the method includes controlling a second inverter (e.g., the other of the first electric motor or the second electric motor) in torque control mode. In one example, torque control mode may include establishing a torque setpoint for the second inverter to prepare for connection of the battery. For example, the torque setpoint may be the torque demand before the request to transition from the second mode to the first mode. The second inverter may adjust current to the second motor thereby maintaining a torque output at the torque setpoint.

At 606, the method 600 includes connecting the battery. The battery may be connected by fully closing the battery contactor, as well as fully closing the second contactor. Current setpoint requested from the battery (e.g., current flowing from the battery) may be equal to zero. Further, inrush current may not occur. In other terms, aside from a negligible difference in voltage between ends of the battery contactor, current may not accumulate at the battery contactor.

At 608, the method 600 may include stopping motor voltage control and transitioning to normal operation with the battery (e.g., hybrid mode).

At 610, the method 600 may include ramping to a battery current setpoint. This may allow current to nominally flow to and from the battery as desired during operation in the hybrid mode. The transmission may thus operate in the hybrid mode, where vehicle propulsion and other auxiliary functions are powered by at least one of the first electric motor and/or the second electric motor via the battery. In this way, the method 600 may allow for seamless transmission from the engine-electric mode to the hybrid mode, where the transition is free of torque interruption and current flow to/from the battery to assist with rotation of the transmission output shaft is enabled.

Turning now to FIG. 7, a schematic representation 700 of a transition from the engine-electric mode to the hybrid mode is shown. FIG. 7 may represent the method 600 described with respect to FIG. 6, and will be described with respect to the transmission of FIG. 1-3, such that elements of FIG. 7 which are equivalent to those of FIGS. 1-3 are similarly numbered.

A third power flow 702 and a fourth power flow 704 may be possible when operating the transmission in the engine-electric mode. For example, the third power flow 702 may be equivalent to the first power flow 504, as described with respect to FIGS. 5A-5B, where the first electric machine 522 is operating as a generator, the second electric machine 524 is operating as a motor, and the battery 514 is disconnected from the transmission (e.g., not providing power to, or receiving power from, either of the first electric machine 522 or the second electric machine 524). The fourth power flow 704 may be equivalent to the second power flow 506, as described with respect to FIGS. 5A-5B, where the first electric machine 522 is operating as a motor, the second electric machine 524 is operating as a generator, and the battery 514 is disconnected from the transmission (e.g., not providing power to, or receiving power from, either of the first electric machine 522 or the second electric machine 524). In both the third power flow 702 and the fourth power flow 704, the ICE may be providing power to the transmission. For each of the third power flow 702 and the fourth power flow 704, two situations may be possible for transitioning the transmission from the engine-electric mode to the hybrid mode, depending on the operating mode of the electric motor (e.g., as a motor or as a generator) to which the inverter maximum is applied.

In a fifth situation 712 (e.g., situation 5) of the third power flow 702, the first electric machine 522 may operate as a generator and the second electric machine 524 may operate as a motor. The voltage setpoint may be:

$$\text{voltage setpoint} = V_{bat} + V_{offset}$$

where Vbat is voltage of the battery and Voffset is a voltage difference between the battery and the DC bus of the transmission. A first DC current threshold may be applied to the first electric machine 522, such that a maximum allowable current generated by the first electric machine 522 is equal to current output 724 by the second electric machine 524. The current 722 generated by the first electric machine 522 and the current 724 output by the second electric machine 524 are represented by arrows. Power generated by the second electric machine 524 may be equal to power generated by the second electric machine 524 prior to implementation of the voltage setpoint on the first electric machine 522. As described with respect to operation 606 of method 600, the battery contactor may be closed to connect the battery 514 to the transmission such that current, via arrow 510, may flow to and from the battery 514. Following connection of the battery 514, the first electric motor may continue operating as a generator and attempt to increase voltage up to the voltage setpoint (e.g., maximum desired voltage). The second electric motor may continue operating as a motor. As described with respect to operation 608 of method 600, inverter/motor voltage control may end, and a setpoint of battery current, via arrow 510, may be increased. The first electric machine 522 may generate current 722 that is allowable by the setpoint of the battery 514. The transmission may thus operate in the hybrid mode.

In a sixth situation 714 (e.g., situation 6) of the third power flow 702, the first electric machine 522 may operate as a generator and the second electric machine 524 may operate as a motor. The voltage setpoint may be:

$$\text{voltage setpoint} = V_{bat} + V_{offset}$$

where Vbat is voltage of the battery and Voffset is a voltage difference between the battery and the DC bus of the transmission. A second DC current threshold may be applied to the second electric machine 524, such that an allowable current used by the second electric machine 524 is equal to current 722 generated by the first electric machine 522. Power generated by the first electric machine 522 may be equal to power generated by the first electric machine 522 prior to implementation of the voltage setpoint on the second electric machine 524. As described with respect to operation 606 of method 600, the battery contactor may be closed to connect the battery 514 to the transmission such that current, via arrow 510, may flow to and from the battery 514. Following connection of the battery 514, the second electric machine 524 may continue operating as a motor and attempt to decrease voltage up to the voltage setpoint. The first electric machine 522 may continue operating as a generator. As described with respect to operation 608 of method 600, the inverter/motor voltage control may end, and a setpoint of battery current, via arrow 510, may be increased. The transmission may thus operate in the hybrid mode.

In a seventh situation 716 (e.g., situation 7) of the fourth power flow 704, the first electric machine 522 may operate as a motor and the second electric machine 524 may operate as a generator. The voltage setpoint may be:

$$\text{voltage setpoint} = V_{bat} + V_{offset}$$

where Vbat is voltage of the battery and Voffset is a voltage difference between the battery and the DC bus of the transmission. A third DC current threshold may be applied to the second electric machine 524, such that a maximum allowable current generated by the second electric machine 524 is equal to current 726 output by the first electric machine 522. The current 726 output by the first electric machine 522 and the current 728 generated by the second electric machine 524 represented by arrows. Power generated by the first electric machine 522 may be equal to power generated by the first electric machine 522 prior to implementation of the voltage control on the second electric machine 524. As described with respect, the battery contactor may be closed to connect the battery 514 to the transmission such that current, via arrow 510, may flow to and from the battery 514. Following connection of the battery 514, the second electric motor may continue operating as a generator and attempt to increase voltage up to the voltage setpoint (e.g., maximum desired voltage). The first electric machine 522 may continue operating as a motor. As described with respect the method 600, the inverter/motor voltage control may end, and a setpoint of battery current, via arrow 510, may be increased. The second electric machine 524 may generate current 728 that is allowable by the setpoint of the battery 514. The transmission may thus operate in the hybrid mode.

In an eighth situation 718 (e.g., situation 8) of the fourth power flow 704, the first electric machine 522 may operate as a motor and the second electric machine 524 may operate as a generator. The voltage setpoint may be:

voltage setpoint=Vbat+Voffset where Vbat is voltage of the battery and Voffset is a voltage difference between the battery and the DC bus of the transmission. A fourth DC current threshold may be applied to the first electric machine 522, such that allowable current used by the first electric machine 522 is equal to current 728 generated by the second electric machine 524. Power generated by the second electric machine 524 may be equal to power generated by the second electric motor prior to implementation of the voltage control on the first electric machine 522. As described with respect to the method 600, the battery contactor may be closed to connect the battery 514 to the transmission such that current, via arrow 510, may flow to and from the battery 514. Following connection of the battery 514, the first electric machine 522 may continue operating as a motor and attempt to decrease voltage up to the voltage setpoint. The second electric machine 524 may continue operating as a generator. As described with respect to the method 600, the inverter/motor voltage control may end, and a setpoint of battery current, via arrow 510, may be increased. Upon removal of the voltage setpoint and the thresholds, the first electric machine 522 may use current 726 which exceeds the DC current threshold. The transmission may thus operate in the hybrid mode.

In this way, the transmission may be transitioned from the engine-electric mode to the hybrid mode according to a situation of the fifth through eighth situations (e.g., for different electric motor operations) without torque interruption. The sixth situation of the third power flow 702 and the eighth situation of the fourth power flow 704 may be preferred for transitioning from the engine-electric mode to the hybrid mode, as implementing the voltage setpoint as a difference between battery voltage and offset voltage and applying the DC current threshold to the electric motor operating as a motor may prevent total voltage from exceeding a desired DC-bus maximum or DC-bus threshold. For example, the DC-bus threshold may be 750V.

Turning to FIG. 8, an example timing diagram 800 is shown, illustrating variations in battery current, electric motor torque, and engine torque during opening and closing of the battery contactor to disconnect and connect the battery, such as such as HV source 316 and/or battery 514 of FIGS. 2, 5A-5B, and 7 to the transmission, respectively. The timing diagram 800 may be implemented in a transmission, such as transmission 30 of FIG. 2, of an e-drive of a vehicle including dual motors, such as transmission of e-drive 200 of FIG. 2.

Timing diagram 800 includes a first plot 802 illustrating whether the battery contactor, such as battery contactor 322, is open (e.g., the battery is disconnected from the transmission) or closed (e.g., the battery is connected to the transmission). A second plot 804 illustrates a level of current flowing to and from the battery. A third plot 806 illustrates torque of the first electric motor (EM1 522) and a fourth plot 808 illustrates torque of the second electric motor (EM2 524). A fifth plot 810 illustrates a level of torque provided by the engine.

As described with respect to method 400 of FIG. 4, transitioning from the hybrid mode to the engine-electric mode includes disconnecting the battery from the transmission. Prior to t1, the battery contactor is closed, thus the battery is connected to the transmission, and battery current is high. Torque of the first electric motor and the second electric motor, such as the first electric machine 522 and the second electric machine 524, respectively with reference to FIGS. 5A-5B and 7, may be approximately equal. The engine, such as engine 512 and/or 112, may not be contributing torque.

At t1, battery current may be commanded to zero. Between t1 and t2, battery current may decrease and engine torque may increase to compensate for the decrease in battery current. Torque of the first electric motor and the second electric motor may be approximately equal and may not change from torque levels prior to t1.

At t2, voltage control may be implemented on an inverter. In the embodiment shown in FIG. 8, voltage control is applied to the first electric motor, which may be operating as a generator. Applying voltage control may include applying a DC current threshold and setting a voltage setpoint for the first electric motor. For example, a maximum amount of voltage which may be used by the first electric motor to generate may be established. As a result, torque of the first electric motor may decrease between t2 and t3. Torque generated by the second electric motor may be equal to torque generated by the second electric motor prior to voltage control of the first electric motor. When the first electric motor is voltage controlled, the first electric motor may generate (e.g., increase voltage) up to the voltage setpoint.

At t3, when voltage generated by the first electric motor is equal to the DC current threshold (e.g., torque of the first electric motor stops decreasing), the battery may be disconnected by opening the battery connects. The transmission may operate in the engine-electric mode and voltage control may be removed from the inverter of the first electric motor, such that torque of the first electric motor and the second electric motor are equal at t4.

As described with respect to method 600 of FIG. 6, transitioning from the engine-electric mode to the hybrid mode includes connecting the battery to the transmission. At t4, the battery contactor is open, thus the battery is disconnected from the transmission, and battery current is approximately zero. Torque of the first electric motor and the second electric motor may be approximately equal. The engine may be contributing torque.

At t5, voltage control may be applied to the second electric motor, including a DC current threshold wherein a maximum allowable current used by the second electric motor is equal to current generated by the first electric motor, and a voltage setpoint may be set. Torque generated by the first electric motor may be equal to torque generated by the first electric motor prior to implementation of voltage control on the second electric motor.

At t6, the battery contactor may be closed to connect the battery to the transmission such that current may flow to and from the battery. Following connection of the battery, the second electric motor may continue operating as a motor and attempt to decrease voltage (e.g., generate torque) up to the inverter maximum allowable voltage. The first electric motor may continue operating as a generator.

At t7, the voltage setpoint and the inverter maximum may be removed, and a setpoint of battery current may be increased. Torque contribution by the engine may decrease to approximately zero. Upon removal of the voltage setpoint and the inverter maximum, the second electric motor may use current which exceeds the inverter maximum. The transmission may thus operate in the hybrid mode.

Systems and methods as described herein for connection and disconnection of a battery to transition a transmission from an engine-electric mode to a hybrid mode and vice versa, respectively, may allow for seamless connection and disconnection without torque or power interruptions towards output shafts of the transmission. Whereas other systems and methods may connect and/or disconnect the battery by shutting down the vehicle and disconnecting/connecting the battery at startup/shutdown, or by going to a torque free state where current in the system is approximately zero, the systems and methods described herein may allow for continued operation of the vehicle by a user, which may allow for an uninterrupted driving experience.

The disclosure also provides support for a method for a hybrid transmission, comprising, adjusting voltage on an inverter of an electric motor prior to disconnecting or connecting a battery contact in response to a transition between a first mode and a second mode, wherein in the first mode, a battery and at least the electric motor are used to power rotation of a transmission output shaft, and wherein in the second mode, an engine and at least the electric motor are used to power rotation of the transmission output shaft. In a first example of the method, the adjusting is initiated in response to a request to transition between the first mode and the second mode. In a second example of the method, optionally including the first example, the method further comprises: controlling current to the battery to within a non-zero threshold of zero in response to the request to transition the first mode to the second mode. In a third example of the method, optionally including one or both of the first and second examples, adjusting voltage comprises setting one of a first voltage setpoint and a second voltage setpoint for the inverter of the electric motor, the first voltage setpoint set above the voltage of the battery and the second voltage setpoint set below the voltage of the battery. In a fourth example of the method, optionally including one or more or each of the first through third examples, the first voltage setpoint is set for a first inverter of a first electric motor operating as a generator and the first inverter increases voltage to the first voltage setpoint. In a fifth example of the method, optionally including one or more or each of the first through fourth examples, the second voltage setpoint is set for a first inverter of a first electric motor operating as a motor and the first electric motor reduces voltage to the second voltage setpoint. In a sixth example of the method, optionally including one or more or each of the first through fifth examples, the method further comprises: setting a torque setpoint for a second inverter of a second electric motor, and adjusting current from the second inverter to the second electric motor to maintain the torque setpoint, wherein the torque setpoint is a torque demand before the request to transition. In a seventh example of the method, optionally including one or more or each of the first through sixth examples, disconnecting the battery contact comprises fully opening the battery contact in response to a DC contactor current less than a threshold. In a eighth example of the method, optionally including one or more or each of the first through seventh examples, the method further comprises: activating the engine to compensate for a change in load in response to controlling current to/from the battery to within a non-zero threshold of zero during transition to the second mode.

The disclosure also provides support for a method for a hybrid transmission, the method comprising: controlling current to/from a battery to within a threshold of zero, adjusting a voltage setpoint of a first inverter of a first electric motor, and disconnecting the battery from the first electric motor and a second electric motor by opening a battery contact in response to a DC contactor current less than a threshold current, and restoring a nominal voltage setpoint for the first inverter of the first electric motor. In a first example of the method, the adjusting is initiated in response to a request to transition from a first mode to a second mode, wherein in the first mode, the battery, the first electric motor, and the second electric motor are used to power rotation of a transmission output shaft, and wherein in the second mode, an engine, the first electric motor, and the second electric motor are used to power rotation of the transmission output shaft. In a second example of the method, optionally including the first example, the method further comprises: controlling a second inverter of the second electric motor to maintain a torque setpoint, wherein the torque setpoint comprises a torque demand before the request to transition between the first mode to the second mode. In a third example of the method, optionally including one or both of the first and second examples, the method further comprises: applying a DC current threshold to the first inverter of the first electric motor, wherein the DC current threshold is estimated based on one or more of torque, speed, and phase current, or measured from a DC-link current. In a fourth example of the method, optionally including one or more or each of the first through third examples, in a first situation comprising the first electric motor operating as a generator and the second electric motor operating as a motor, in response to the request to transition from the first mode to the second mode, applying a first control strategy comprising applying a first DC current threshold to the first electric motor, wherein the first inverter generates no more DC current than requested, setting a first voltage setpoint for the first electric motor that is a sum of a voltage of the battery and a voltage difference between the battery and the hybrid transmission, increasing the voltage of the first electric motor to the first voltage setpoint, maintaining torque output from the second electric motor equal to the torque setpoint, and opening the battery contact in response to the DC contactor current less than the threshold current, and wherein in a second situation comprising the first electric motor operating as the generator and the second electric motor operating as the motor, in response to the request to transition from the first mode to the second mode, applying a second control strategy comprising applying a second DC current threshold to the second electric motor, wherein the second inverter requests no more DC current than generated, setting a second voltage setpoint for the second electric motor that is a difference of the voltage of the battery and the voltage difference between the battery and the hybrid transmission, decreasing the voltage of the second electric motor to the second voltage setpoint, maintaining torque output from the first electric motor equal to the torque setpoint, and opening the battery contact in response to the DC contactor current less than the threshold. In a fifth example of the method, optionally including one or more or each of the first through fourth examples, the second control strategy is selected based on an indication of a battery voltage greater than a first threshold voltage and wherein the first control strategy is selected based on the indication of the battery voltage less than a second threshold voltage. In a sixth example of the method, optionally including one or more or each of the first through fifth examples, in a first situation comprising the first electric motor operating as a generator and the second electric motor operating as a motor, in response to a request to transition from the second mode to the first mode, applying a first control strategy comprising setting a first voltage setpoint for the first electric motor that is a sum of a voltage of the battery and a voltage difference between the battery and the hybrid transmission, applying a first DC current threshold to the first electric motor, wherein the first inverter generates no more DC current than requested, maintaining torque output from the second electric motor equal to the torque setpoint, and closing the battery contact, and wherein in a second situation comprising the first electric motor operating as the generator and the second electric motor operating as the motor, in response to the request to transition from the second mode to the first mode, applying a second control strategy comprising setting a second voltage setpoint for the second electric motor that is a difference of the voltage of the battery and the voltage difference the battery and the hybrid transmission, applying a second DC current threshold to the second electric motor, wherein the second inverter requests no more DC current than generated, maintaining torque output from the first electric motor equal to the torque setpoint, and closing the battery contact. In a seventh example of the method, optionally including one or more or each of the first through sixth examples, the second control strategy is selected based on an indication of a total voltage greater than a DC-bus threshold.

The disclosure also provides support for a transmission, comprising: an engine, a first electric motor having a first inverter, a second electric motor having a second inverter, a battery which may be selectively coupled to at least one of the first electric motor and the second electric motor via a battery contactor, and a controller storing instructions in non-transitory memory that, when executed, cause the controller to, in response to a request to transition the transmission from a first mode to a second mode: control current to/from the battery to within a non-zero threshold of zero, adjust a voltage setpoint of the first inverter of the first electric motor that is equal to a sum of a voltage of the battery and a voltage difference between the battery and the transmission, apply a DC current threshold to the first electric motor, wherein the first inverter provides no more DC current than requested, disconnect the battery to the first electric motor and the second electric motor by opening the battery contactor in response to a DC contactor current less than a threshold, and, restore a nominal voltage setpoint to the first electric motor, wherein in the first mode, the battery, the first electric motor, and the second electric motor are used to power rotation of a transmission output shaft, and wherein in the second mode, the engine, the first electric motor, and the second electric motor are used to power rotation of the transmission output shaft. In a first example of the system the controller having further instructions in non-transitory memory that, when executed, cause the controller to, in response to the request to transition the transmission from the first mode to the second mode: adjust a torque setpoint of the second inverter of the second electric motor to torque demand before the request to transition. In a second example of the system, optionally including the first example the controller having further instructions in non-transitory memory that, when executed, cause the controller to, in response to the request to transition the transmission from the first mode to the second mode: activate the engine to compensate for a change in load in response to controlling current to/from the battery to within the non-zero threshold of zero.

In another representation, a method for a hybrid transmission, the method comprising: controlling current to/from a battery to within a threshold of zero; determining a voltage setpoint of a first inverter of a first electric motor; applying a DC current threshold to the first electric motor that is equal to a DC current output of a second electric motor; controlling the first electric motor in voltage control in response to confirming the DC current threshold is active; disconnecting the battery from the first electric motor and the second electric motor by opening a battery contact in response to a DC contactor current less than a threshold current; and restoring a nominal voltage setpoint for the first inverter of the first electric motor.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid transmission, the method comprising the steps of: adjusting voltage on an inverter of an electric motor prior to disconnecting or connecting a battery contact in response to a transition between a first mode and a second mode by:
controlling current to/from the battery to within a threshold of zero, and
setting different voltage setpoints of the inverter of the electric motor for each of the electric motor operating as a generator and the electric motor operating as a motor,
wherein in the first mode, a battery and at least the electric motor are used to power rotation of a transmission output shaft, and wherein in the second mode, an engine and at least the electric motor are used to power rotation of the transmission output shaft.

2. The method of claim 1, wherein the adjusting is initiated in response to a request to transition between the first mode and the second mode.

3. The method of claim 2, wherein controlling current to/from the battery to within the threshold of zero comprises controlling current to/from the battery to a value greater than zero and less than 5 amps.

4. The method of claim 1, wherein adjusting voltage comprises setting one of a first voltage setpoint and a second voltage setpoint for the inverter of the electric motor, the first voltage setpoint set above the voltage of the battery and the second voltage setpoint set below the voltage of the battery.

5. The method of claim 4, wherein the first voltage setpoint is set for a first inverter of a first electric motor operating as the generator and the first inverter increases voltage to the first voltage setpoint.

6. The method of claim 4, wherein the second voltage setpoint is set for a first inverter of a first electric motor operating as the motor and the first electric motor reduces voltage to the second voltage setpoint.

7. The method of claim 2, further comprising setting a torque setpoint for a second inverter of a second electric motor, and adjusting current from the second inverter to the second electric motor to maintain the torque setpoint, wherein the torque setpoint is a torque demand before the request to transition.

8. The method of claim 1, wherein disconnecting the battery contact comprises fully opening the battery contact in response to a DC contactor current less than a threshold.

9. The method of claim 2, further comprising activating the engine to compensate for a change in load in response to controlling current to/from the battery to within the threshold of zero during transition to the second mode.

10. A method for a hybrid transmission, the method comprising the steps of:
controlling current to/from a battery to within a threshold of zero;
adjusting a voltage setpoint of a first inverter of a first electric motor;
disconnecting the battery from the first electric motor and a second electric motor by opening a battery contact in response to a DC contactor current less than a threshold current; and
restoring a nominal voltage setpoint for the first inverter of the first electric motor.

11. The method of claim 10, wherein the adjusting is initiated in response to a request to transition from a first mode to a second mode, wherein in the first mode, the battery, the first electric motor, and the second electric motor are used to power rotation of a transmission output shaft, and wherein in the second mode, an engine, the first electric motor, and the second electric motor are used to power rotation of the transmission output shaft.

12. The method of claim 11, further comprising controlling a second inverter of the second electric motor to maintain a torque setpoint, wherein the torque setpoint comprises a torque demand before the request to transition between the first mode to the second mode.

13. The method of claim 12, further comprising applying a DC current threshold to the first inverter of the first electric motor, wherein the DC current threshold is estimated based on one or more of torque, speed, and phase current, or measured from a DC-link current.

14. The method of claim 13, wherein in a first situation comprising the first electric motor operating as a generator and the second electric motor operating as a motor, in response to the request to transition from the first mode to the second mode, applying a first control strategy comprising applying a first DC current threshold to the first electric motor, wherein the first inverter generates no more DC current than requested, setting a first voltage setpoint for the first electric motor that is a sum of a voltage of the battery and a voltage difference between the battery and the hybrid transmission, increasing the voltage of the first electric motor to the first voltage setpoint, maintaining torque output from the second electric motor equal to the torque setpoint, and opening the battery contact in response to the DC contactor current less than the threshold current; and
wherein in a second situation comprising the first electric motor operating as the generator and the second electric motor operating as the motor, in response to the request to transition from the first mode to the second mode, applying a second control strategy comprising applying a second DC current threshold to the second electric motor, wherein the second inverter requests no more DC current than generated, setting a second voltage setpoint for the second electric motor that is a difference of the voltage of the battery and the voltage difference between the battery and the hybrid transmission, decreasing the voltage of the second electric motor to the second voltage setpoint, maintaining torque output from the first electric motor equal to the torque setpoint, and opening the battery contact in response to the DC contactor current less than the threshold.

15. The method of claim 14, wherein the second control strategy is selected based on an indication of a battery voltage greater than a first threshold voltage and wherein the first control strategy is selected based on the indication of the battery voltage less than a second threshold voltage.

16. The method of claim 13, wherein in a first situation comprising the first electric motor operating as a generator and the second electric motor operating as a motor, in response to a request to transition from the second mode to the first mode, applying a first control strategy comprising setting a first voltage setpoint for the first electric motor that is a sum of a voltage of the battery and a voltage difference between the battery and the hybrid transmission, applying a first DC current threshold to the first electric motor, wherein the first inverter generates no more DC current than requested, maintaining torque output from the second electric motor equal to the torque setpoint, and closing the battery contact; and wherein in a second situation comprising the first electric motor operating as the generator and the second electric motor operating as the motor, in response to the request to transition from the second mode to the first mode, applying a second control strategy comprising setting a second voltage setpoint for the second electric motor that is a difference of the voltage of the battery and the voltage difference the battery and the hybrid transmission, applying a second DC current threshold to the second electric motor, wherein the second inverter requests no more DC current than generated, maintaining torque output from the first electric motor equal to the torque setpoint, and closing the battery contact.

17. The method of claim 16, wherein the second control strategy is selected based on an indication of a total voltage greater than a DC-bus threshold.

18. A transmission, comprising:
an engine;
a first electric motor having a first inverter;
a second electric motor having a second inverter;
a battery which may be selectively coupled to at least one of the first electric motor and the second electric motor via a battery contactor; and
a controller storing instructions in non-transitory memory that, when executed, cause the controller to, in response to a request to transition the transmission from a first mode to a second mode:
control current to/from the battery to within a threshold of zero;
adjust a voltage setpoint of the first inverter of the first electric motor that is equal to a sum of a voltage of the battery and a voltage difference between the battery and the transmission,
apply a DC current threshold to the first electric motor, wherein the first inverter provides no more DC current than requested;
disconnect the battery to the first electric motor and the second electric motor by opening the battery contactor in response to a DC contactor current less than a threshold; and,
restore a nominal voltage setpoint to the first electric motor;
wherein in the first mode, the battery, the first electric motor, and the second electric motor are used to power rotation of a transmission output shaft, and wherein in the second mode, the engine, the first electric motor, and the second electric motor are used to power rotation of the transmission output shaft.

19. The transmission of claim 18, the controller having further instructions in non-transitory memory that, when executed, cause the controller to, in response to the request to transition the transmission from the first mode to the second mode:
adjust a torque setpoint of the second inverter of the second electric motor to torque demand before the request to transition.

20. The transmission of claim 18, the controller having further instructions in non-transitory memory that, when executed, cause the controller to, in response to the request to transition the transmission from the first mode to the second mode:
activate the engine to compensate for a change in load in response to controlling current to/from the battery to within the threshold of zero.

* * * * *